(12) United States Patent
Goswami et al.

(10) Patent No.: US 12,737,554 B2
(45) Date of Patent: Sep. 15, 2026

(54) GENERATING TEXT PROMPTS FOR DIGITAL IMAGES UTILIZING VISION-LANGUAGE MODELS AND CONTEXTUAL PROMPT LEARNING

(71) Applicant: Adobe Inc., San Jose, CA (US)

(72) Inventors: Koustava Goswami, Bangalore (IN); Srikrishna Karanam, Bangalore (IN); Joseph Koonthanam Jose, Kottayam (IN); Prateksha Udhayanan, Bangalore (IN); Balaji Vasan Srinivasan, Bangalore (IN)

(73) Assignee: Adobe Inc., San Jose, CA (US)

( * ) Notice: Subject to any disclaimer, the term of this patent is extended or adjusted under 35 U.S.C. 154(b) by 285 days.

(21) Appl. No.: 18/342,954

(22) Filed: Jun. 28, 2023

(65) Prior Publication Data

US 2025/0005296 A1 Jan. 2, 2025

(51) Int. Cl.
*G06F 40/40* (2020.01)
*G06V 10/77* (2022.01)
*G06V 10/82* (2022.01)

(52) U.S. Cl.
CPC .......... *G06F 40/40* (2020.01); *G06V 10/7715* (2022.01); *G06V 10/82* (2022.01)

(58) Field of Classification Search
CPC .... G06F 40/40; G06V 10/7715; G06V 10/82; G06V 10/80; G10L 17/10
See application file for complete search history.

(56) References Cited

U.S. PATENT DOCUMENTS

2022/0383048 A1* 12/2022 Fei .......................... G06F 40/44
2022/0391755 A1* 12/2022 Li ........................ G06V 30/153
2023/0281963 A1* 9/2023 Gopalkrishna ...... G06V 10/806 382/157
2024/0119257 A1* 4/2024 Guo ....................... G06V 10/82
2024/0153258 A1* 5/2024 Mangla ................ G06V 10/764
(Continued)

OTHER PUBLICATIONS

Aishwarya Kamath, et al. MDETR—modulated detection for end-to-end multi-modal understanding. In 2021 IEEE/CVF International Conference on Computer Vision, ICCV 2021, Montreal, QC, Canada, Oct. 10-17, 2021, pp. 1760-1770. IEEE, 2021.
(Continued)

*Primary Examiner* — Michael N Opsasnick
(74) *Attorney, Agent, or Firm* — Keller Preece PLLC

(57) ABSTRACT

The present invention relates to systems, methods, and non-transitory computer-readable media that implements a vision language machine learning model to generate text representations of digital image from localized context tokens, where the text representations semantically reflect the content of the digital image under consideration. In particular, in some embodiments, the disclosed invention generates image patch feature representations that represent patches from an input image. Further, in some embodiments, the disclosed invention generates localized context tokens from the image patch feature representations and prompt context tokens. Moreover, in some embodiments, by utilizing the localized context tokens, the disclosed invention generates a text representation by utilizing a text encoder of the vision language machine learning model.

20 Claims, 11 Drawing Sheets

(56) References Cited

U.S. PATENT DOCUMENTS

2024/0220722 A1* 7/2024 Khattak ................ G06F 40/126
2025/0005296 A1* 1/2025 Goswami ........... G06V 10/7715

OTHER PUBLICATIONS

Alec Radford, et al. Learning transferable visual models from natural language supervision. In Marina Meila and Tong Zhang, editors, Proceedings of the 38th International Conference on Machine Learning, ICML 2021, Jul. 18-24, 2021, Virtual Event, vol. 139 of Proceedings of Machine Learning Research, pp. 8748-8763. PMLR, 2021.
Alex Krizhevsky, et al. Imagenet classification with deep convolutional neural networks. In Peter L. Bartlett, Fernando C. N. Pereira, Christopher J. C. Burges, Leon Bottou, and Kilian Q. Weinberger, editors, Advances in Neural Information Processing Systems 25: 26th Annual Conference on Neural Information Processing Systems 2012. Proceedings of a meeting held Dec. 3-6, 2012, Lake Tahoe, Nevada, United States, pp. 1106-1114, 2012.
Alexander Kolesnikov, et al. Big transfer (bit): General visual representation learning. In Andrea Vedaldi, Horst Bischof, Thomas Brox, and Jan Michael Frahm, editors, Computer Vision—ECCV 2020—16th European Conference, Glasgow, UK, Aug. 23-28, 2020, Proceedings, Part V, vol. 12350 of Lecture Notes in Computer Science, pp. 491-507. Springer, 2020.
Alexey Dosovitskiy, et al. An image is worth 16×16 words: Transformers for image recognition at scale. In 9th International Conference on Learning Representations, ICLR 2021, Virtual Event, Austria, May 3-7, 2021. OpenReview.net, 2021.
Alina Kuznetsova, et al. The open images dataset V4: unified image classification, object detection, and visual relationship detection at scale. CoRR, abs/1811.00982, 2018.
Andrea Frome, et al. Devise: A deep visual-semantic embedding model. In Christopher J. C. Burges, Lé on Bottou, Zoubin Ghahramani, and Kilian Q. Weinberger, editors, Advances in Neural Information Processing Systems 26: 27th Annual Conference on Neural Information Processing Systems 2013. Proceedings of a meeting held Dec. 5-8, 2013, Lake Tahoe, Nevada, United States, pp. 2121-2129, 2013.
Andreas Furst, et al. CLOOB: modern hopfield networks with infoloob outperform CLIP. CoRR, abs/2110.11316, 2021.
Andy T. Liu, et al. Qaner: Prompting question answering models for few-shot named entity recognition. CoRR, abs/2203.01543, 2022.
Ang Li, et al. Learning visual n-grams from web data. In Proceedings of the IEEE International Conference on Computer Vision, pp. 4183-4192, 2017.
Armand Joulin, et al. Learning visual features from large weakly supervised data. In Computer Vision—ECCV 2016: 14th European Conference, Amsterdam, The Netherlands, Oct. 11-14, 2016, Proceedings, Part VII 14, pp. 67-84. Springer, 2016.
Ashish Vaswani, et al. Attention is all you need. In Isabelle Guyon, Ulrike von Luxburg, Samy Bengio, Hanna M. Wallach, Rob Fergus, S. V. N. Vishwanathan, and Roman Garnett, editors, Advances in Neural Information Processing Systems 30: Annual Conference on Neural Information Processing Systems 2017, Dec. 4-9, 2017, Long Beach, CA, USA, pp. 5998-6008, 2017.
Brian Lester, et al. The power of scale for parameter-efficient prompt tuning. In Marie-Francine Moens, Xuanjing Huang, Lucia Specia, and Scott Wen-tau Yih, editors, Proceedings of the 2021 Conference on Empirical Methods in Natural Language Processing, EMNLP 2021, Virtual Event / Punta Cana, Dominican Republic, Nov. 7-11, 2021, pp. 3045-3059. Association for Computational Linguistics, 2021.
Chao Jia, et al. Scaling up visual and vision-language representation learning with noisy text supervision. In Marina Meila and Tong Zhang, editors, Proceedings of the 38th International Conference on Machine Learning, ICML 2021, Jul. 18-24, 2021, Virtual Event, vol. 139 of Proceedings of Machine Learning Research, pp. 4904-4916. PMLR, 2021.
Chen Sun, et al. Revisiting unreasonable effectiveness of data in deep learning era. In IEEE International Conference on Computer Vision, ICCV 2017, Venice, Italy, Oct. 22-29, 2017, pp. 843-852. IEEE Computer Society, 2017.
Fabio Petroni, et al. Language models as knowledge bases? In Kentaro Inui, Jing Jiang, Vincent Ng, and Xiaojun Wan, editors, Proceedings of the 2019 Conference on Empirical Methods in Natural Language Processing and the 9th International Joint Conference on Natural Language Processing, EMNLP-IJCNLP 2019, Hong Kong, China, Nov. 3-7, 2019, pp. 2463-2473. Association for Computational Linguistics, 2019.
Jacob Devlin, et al. BERT: pre-training of deep bidirectional transformers for language understanding. In Jill Burstein, Christy Doran, and Thamar Solorio, editors, Proceedings of the 2019 Conference of the North American Chapter of the Association for Computational Linguistics: Human Language Technologies, NAACL-HLT 2019, Minneapolis, MN, USA, Jun. 2-7, 2019, vol. 1 (Long and Short Papers), pp. 4171-4186. Association for Computational Linguistics, 2019.
Jia Deng, et al. Imagenet: A large-scale hierarchical image database. In 2009 IEEE Computer Society Conference on Computer Vision and Pattern Recognition (CVPR 2009), Jun. 20-25, 2009, Miami, Florida, USA, pp. 248-255. IEEE Computer Society, 2009.
Jianxiong Xiao, et al. SUN database: Large-scale scene recognition from abbey to zoo. In The Twenty-Third IEEE Conference on Computer Vision and Pattern Recognition, CVPR 2010, San Francisco, CA, USA, Jun. 13-18, 2010, pp. 3485-3492. IEEE Computer Society, 2010.
Jo Plested and Tom Gedeon. Deep transfer learning for image classification: a survey. CoRR, abs/2205.09904, 2022.
Jonathan Krause, et al. 3d object representations for fine-grained categorization. In 2013 IEEE International Conference on Computer Vision Workshops, ICCV Workshops 2013, Sydney, Australia, Dec. 1-8, 2013, pp. 554-561. IEEE Computer Society, 2013.
Kaiming He, et al. Deep residual learning for image recognition. In 2016 IEEE Conference on Computer Vision and Pattern Recognition, CVPR 2016, Las Vegas, NV, USA, Jun. 27-30, 2016, pp. 770-778. IEEE Computer Society, 2016.
Kaiming He, et al. Momentum contrast for unsupervised visual representation learning. In 2020 IEEE/CVF Conference on Computer Vision and Pattern Recognition, CVPR 2020, Seattle, WA, USA, Jun. 13-19, 2020, pp. 9726-9735. Computer Vision Foundation / IEEE, 2020.
Kaiyang Zhou, et al. Conditional prompt learning for vision-language models. In IEEE/CVF Conference on Computer Vision and Pattern Recognition, CVPR 2022, New Orleans, LA, USA, Jun. 18-24, 2022, pp. 16795-16804. IEEE, 2022.
Kaiyang Zhou, et al. Learning to prompt for vision-language models. Int. J. Comput. Vis., 130(9):2337-2348, 2022.
Karan Desai and Justin Johnson. Virtex: Learning visual representations from textual annotations. In Proceedings of the IEEE/CVF conference on computer vision and pattern recognition, pp. 11162-11173, 2021.
Karen Simonyan and Andrew Zisserman. Very deep convolutional networks for large-scale image recognition. In Yoshua Bengio and Yann LeCun, editors, 3rd International Conference on Learning Representations, ICLR 2015, San Diego, Ca, USA, May 7-9, 2015, Conference Track Proceedings, 2015.
Khurram Soomro, et al. UCF101: A dataset of 101 human actions classes from videos in the wild. CoRR, abs/1212.0402, 2012.
Koustava Goswami, et al. Switchprompt: Learning domain-specific gated soft prompts for classification in low-resource domains. CoRR, abs/2302.06868, 2023.
Lei Jimmy Ba, et al. Predicting deep zero-shot convolutional neural networks using textual descriptions. In 2015 IEEE International Conference on Computer Vision, ICCV 2015, Santiago, Chile, Dec. 7-13, 2015, pp. 4247-4255. IEEE Computer Society, 2015.
Li Fei-Fei, et al. Learning generative visual models from few training examples: An incremental bayesian approach tested on 101 object categories. In 2004 conference on computer vision and pattern recognition workshop, pp. 178-178. IEEE, 2004.

(56) References Cited

OTHER PUBLICATIONS

Liunian Harold Li, et al. Grounded language-image pre-training. In IEEE/CVF Conference on Computer Vision and Pattern Recognition, CVPR 2022, New Orleans, LA, USA, Jun. 18-24, 2022, pp. 10955-10965. IEEE, 2022.
Liunian Harold Li, et al. Visualbert: A simple and performant baseline for vision and language. CoRR, abs/1908.03557, 2019.
Lluis Gomez, et al. Self-supervised learning of visual features through embedding images into text topic spaces. In Proceedings of the IEEE conference on computer vision and pattern recognition, pp. 4230-4239, 2017.
Lukas Bossard, et al. Food-101—mining discriminative components with random forests. In David J. Fleet, Tomas Pajdla, Bernt Schiele, and Tinne Tuytelaars, editors, Computer Vision—ECCV 2014—13th European Conference, Zurich, Switzerland, Sep. 6-12, 2014, Proceedings, Part VI, vol. 8694 of Lecture Notes in Computer Science, pp. 446-461. Springer, 2014.
Maria-Elena Nilsback and Andrew Zisserman. Automated flower classification over a large number of classes. In Sixth Indian Conference on Computer Vision, Graphics & Image Processing, ICVGIP 2008, Bhubaneswar, India, Dec. 16-19, 2008, pp. 722-729. IEEE Computer Society, 2008.
Mihir Parmar, et al. Inboxbart: Get instructions into biomedical multi-task learning. In Marine Carpuat, Marie-Catherine de Marneffe, and Iv á n Vladimir Meza Ruiz, editors, Findings of the Association for Computational Linguistics: NAACL 2022, Seattle, WA, United States, Jul. 10-15, 2022, pp. 112-128. Association for Computational Linguistics, 2022.
Mingkai Deng, et al. Rlprompt: Optimizing discrete text prompts with reinforcement learning. In Yoav Goldberg, Zornitsa Kozareva, and Yue Zhang, editors, Proceedings of the 2022 Conference on Empirical Methods in Natural Language Processing, EMNLP 2022, Abu Dhabi, United Arab Emirates, Dec. 7-11, 2022, pp. 3369-3391. Association for Computational Linguistics, 2022.
Mircea Cimpoi, et al. Describing textures in the wild. In 2014 IEEE Conference on Computer Vision and Pattern Recognition, CVPR 2014, Columbus, OH, USA, Jun. 23-28, 2014, pp. 3606-3613. IEEE Computer Society, 2014.
Mitchell Wortsman, et al. Robust fine-tuning of zero-shot models. In Proceedings of the IEEE/CVF Conference on Computer Vision and Pattern Recognition, pp. 7959-7971, 2022.
Mohamed Elhoseiny, et al. Write a classifier: Zero-shot learning using purely textual descriptions. In IEEE International Conference on Computer Vision, ICCV 2013, Sydney, Australia, Dec. 1-8, 2013, pp. 2584-2591. IEEE Computer Society, 2013.
Olivier J. Henaff. Data-efficient image recognition with contrastive predictive coding. In Proceedings of the 37th International Conference on Machine Learning, ICML 2020, Jul. 13-18, 2020, Virtual Event, vol. 119 of Proceedings of Machine Learning Research, pp. 4182-4192. PMLR, 2020.
Omkar M. Parkhi, et al. Cats and dogs. In 2012 IEEE Conference on Computer Vision and Pattern Recognition, Providence, RI, USA, Jun. 16-21, 2012, pp. 3498-3505. IEEE Computer Society, 2012.
Patrick Helber, et al. Introducing eurosat: A novel dataset and deep learning benchmark for land use and land cover classification. In 2018 IEEE International Geoscience and Remote Sensing Symposium, IGARSS 2018, Valencia, Spain, Jul. 22-27, 2018, pp. 204-207. IEEE, 2018.
Peng Gao, et al. Clip-adapter: Better vision-language models with feature adapters. CoRR, abs/2110.04544, 2021.
Pengfei Liu, et al. Pre-train, prompt, and predict: A systematic survey of prompting methods in natural language processing. ACM Comput. Surv., 55(9):195:1195:35, 2023.
Richard Socher, et al. Zero-shot learning through cross-modal transfer. In Christopher J. C. Burges, L é on Bottou, Zoubin Ghahramani, and Kilian Q. Weinberger, editors, Advances in Neural Information Processing Systems 26: 27th Annual Conference on Neural Information Processing Systems 2013. Proceedings of a meeting held Dec. 5-8, 2013, Lake Tahoe, Nevada, United States, pp. 935-943, 2013.
Ruosi Wan, et al. Towards making deep transfer learning never hurt. In Jianyong Wang, Kyuseok Shim, and Xindong Wu, editors, 2019 IEEE International Conference on Data Mining, ICDM 2019, Beijing, China, Nov. 8-11, 2019, pp. 578-587. IEEE, 2019.
Sebastian Ruder. An overview of gradient descent optimization algorithms. CoRR, abs/1609.04747, 2016.
Subhransu Maji, et al. Fine-grained visual classification of aircraft. CoRR, abs/1306.5151, 2013.
Thang Luong, et al. Effective approaches to attention-based neural machine translation. In Lluis Marquez, Chris Callison-Burch, Jian Su, Daniele Pighin, and Yuval Marton, editors, Proceedings of the 2015 Conference on Empirical Methods in Natural Language Processing, EMNLP 2015, Lisbon, Portugal, Sep. 17-21, 2015, pp. 1412-1421. The Association for Computational Linguistics, 2015.
Tianyu Gao, et al. Making pre-trained language models better few-shot learners. In Chengqing Zong, Fei Xia, Wenjie Li, and Roberto Navigli, editors, Proceedings of the 59th Annual Meeting of the Association for Computational Linguistics and the 11th International Joint Conference on Natural Language Processing, ACL/IJCNLP 2021, (vol. 1: Long Papers), Virtual Event, Aug. 1-6, 2021, pp. 3816-3830. Association for Computational Linguistics, 2021.
Timo Schick and Hinrich Schutze. Exploiting cloze questions for few-shot text classification and natural language inference. In Paola Merlo, J'org Tiedemann, and Reut Tsarfaty, editors, Proceedings of the 16th Conference of the European Chapter of the Association for Computational Linguistics: Main Volume, EACL 2021, Online, Apr. 19-23, 2021, pp. 255-269. Association for Computational Linguistics, 2021.
Tom B. Brown, et al. Language models are few-shot learners. In Hugo Larochelle, Marc Aurelio Ranzato, Raia Hadsell, Maria-Florina Balcan, and HsuanTien Lin, editors, Advances in Neural Information Processing Systems 33: Annual Conference on Neural Information Processing Systems 2020, NeurIPS 2020, Dec. 6-12, 2020, virtual, 2020.
Xiang Lisa Li and Percy Liang. Prefix-tuning: Optimizing continuous prompts for generation. In Chengqing Zong, Fei Xia, Wenjie Li, and Roberto Navigli, editors, Proceedings of the 59th Annual Meeting of the Association for Computational Linguistics and the 11th International Joint Conference on Natural Language Processing, ACL/IJCNLP 2021, (vol. 1: Long Papers), Virtual Event, Aug. 1-6, 2021, pp. 4582-4597. Association for Computational Linguistics, 2021.
Xiao Liu, et al. GPT understands, too. CoRR, abs/2103.10385, 2021.
Xiao Liu, et al. P-tuning: Prompt tuning can be comparable to fine-tuning across scales and tasks. In Smaranda Muresan, Preslav Nakov, and Aline Villavicencio, editors, Proceedings of the 60th Annual Meeting of the Association for Computational Linguistics (vol. 2: Short Papers), ACL 2022, Dublin, Ireland, May 22-27, 2022, pp. 61-68. Association for Computational Linguistics, 2022.
Yafu Li, et al. Prompt-driven neural machine translation. In Smaranda Muresan, Preslav Nakov, and Aline Villavicencio, editors, Findings of the Association for Computational Linguistics: ACL 2022, Dublin, Ireland, May 22-27, 2022, pp. 2579-2590. Association for Computational Linguistics, 2022.
Yangguang Li, et al. Supervision exists everywhere: A data efficient contrastive language-image pre-training paradigm. In The Tenth International Conference on Learning Representations, ICLR 2022, Virtual Event, Apr. 25-29, 2022. OpenReview.net, 2022.
Yi Zhu, et al. Prompt-learning for short text classification. CoRR, abs/2202.11345, 2022.
Yunhui Guo, et al. Spottune: Transfer learning through adaptive fine-tuning. In IEEE Conference on Computer Vision and Pattern Recognition, CVPR 2019, Long Beach, CA, USA, Jun. 16-20, 2019, pp. 4805-4814. Computer Vision Foundation / IEEE, 2019.
Zhengbao Jiang, et al.. How can we know what language models know. Trans. Assoc. Comput. Linguistics, 8:423-438, 2020.

* cited by examiner

| Methodology | Class Type | Caltech101 | DTD |
|---|---|---|---|
| Global Attention + Global Features | Seen | 97.2 | 77.4 |
| | Unseen | 94.1 | 39.9 |
| Global Attention + Local Features | Seen | **98.1** | **78.0** |
| | Unseen | **94.9** | **50.0** |

*Fig. 7A*

| Methodology | Accuracy |
|---|---|
| CLIP | 65.2 |
| CoOp | 65.6 |
| CoCoOp | 69.1 |
| CoPL | **74.7** |

*Fig. 7B*

GENERATING TEXT PROMPTS FOR DIGITAL IMAGES UTILIZING VISION-LANGUAGE MODELS AND CONTEXTUAL PROMPT LEARNING

BACKGROUND

Recent years have seen significant advancement in hardware and software platforms for vision-language models. For example, many software platforms utilize vision-language models to generate image captions for a digital image. Further, many conventional systems utilize these vision language models for various tasks that involve understanding the relationship between visual elements and textual elements. However, despite these advancements, existing software platform systems with vision-language models continue to suffer from a variety of problems with regard to computational accuracy and operational flexibility of implementing computing devices.

SUMMARY

One or more embodiments described herein provide benefits and/or solve one or more of the problems in the art with systems, methods, and non-transitory computer-readable media that implements a vision language machine learning model to generate a text representation of an input digital image from localized context tokens. In particular, in one or more implementations the disclosed systems utilize contextual prompt learning that aligns prompts to local image context, realized with local features, and determines which prompts are more semantically relevant conditioning on such local context. By utilizing this approach, the disclosed systems can learn a more appropriate weighting of the prompts that is semantically reflective of the actual content of the image under consideration. During training, the disclosed systems can align each local feature vector (e.g., computed from a local image patch) to a set of dynamic soft prompts using a learned context vector that attends to these prompt vectors. This produces a set of attention weights for the prompt vectors that are semantically aligned to local image regions. In one or more embodiments, this results in the disclosed systems learning more generalizable features, as demonstrated through experimental results.

To illustrate, in some embodiments, the disclosed systems extract image patches from an input digital image and generates image patch feature representations from the image patches. Further, in one or more embodiments, the disclosed systems generate localized context tokens by aligning prompt context tokens to the image patch feature representations. In one or more embodiments, by generating the localized context tokens that correspond with local features, the disclosed system further generates a text representation (e.g., a text prediction) that corresponds with the input digital image. Additionally, in one or more embodiments, the disclosed systems train the vision language machine learning model by using the local image features as part of the prompt learning process. Furthermore, the local image features assist the disclosed systems in learning to appropriately weigh prompts based on local features of an input digital image.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 7A-7B illustrates example results of an ablation study of the localized context learning system in accordance with one or more embodiments;

DETAILED DESCRIPTION

Figure 1:
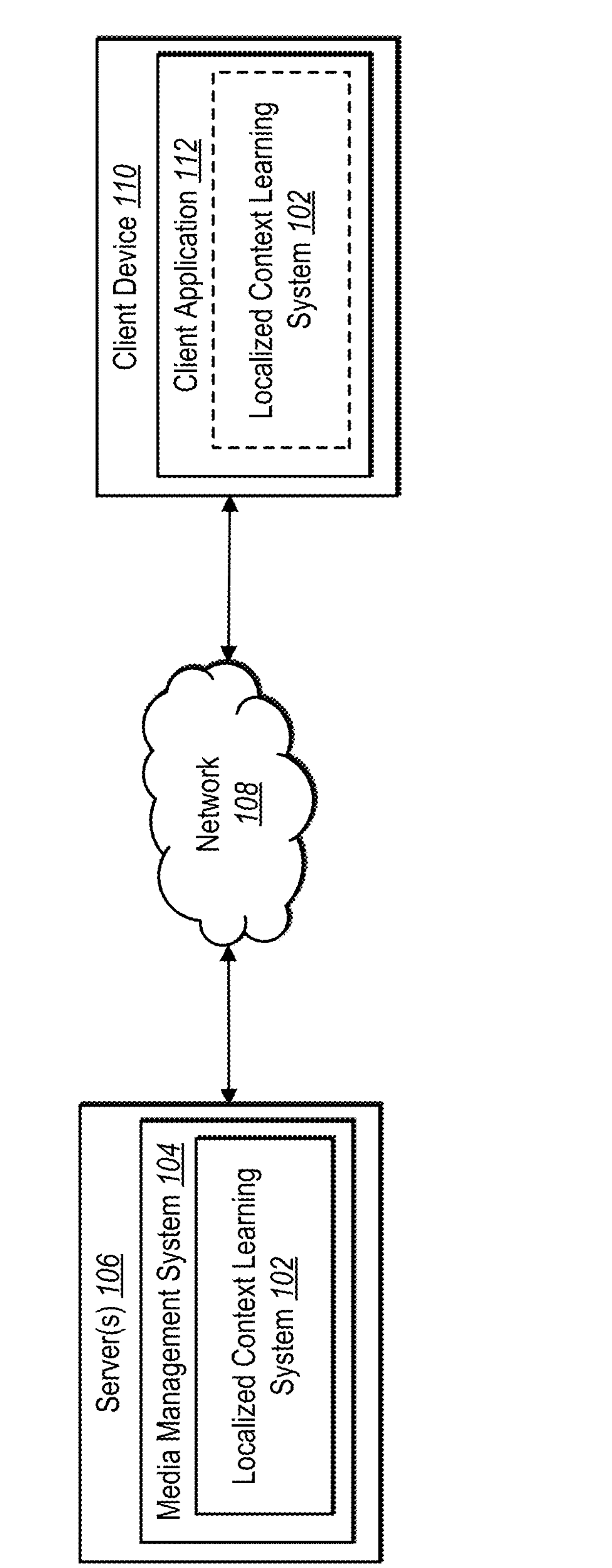
FIG. 1 illustrates an example environment in which a localized context learning system operates in accordance with one or more embodiments.

One or more embodiments described herein include a localized context learning system that implements a vision language machine learning model that generates text predictions based on localized features of an input image. In particular, in one or more implementations the localized context learning system utilizes a contextual prompt learning framework capable of aligning prompts to localized features of a digital image. For instance, the localized context learning system uses localized image features as part of the prompt learning process. Moreover, in one or more embodiments the localized context learning systems learns to weight these prompts based on local features that are appropriate for the task at hand. This approach gives dynamic prompts that are both aligned to local image features as well as aware of local contextual relationships. A variety of experiments outlined below demonstrate that the localized context learning system can produce substantially improved performance relative to conventional systems.

In one or more embodiments, the localized context learning system generates image patch feature representations from an input image. For example, the localized context learning system processes the input image via an image encoder to generate the image patch feature representations. For instance, in some embodiments, the localized context learning system extracts patches from the input image and generates image patch feature vectors from the extracted patches. Moreover, in some embodiments the localized context learning system 102 processes the image patch feature vectors via a neural network to generate conditional image patch tokens.

As mentioned above, in one or more embodiments, the localized context learning system utilizes prompt context tokens. For example, the localized context learning system initializes prompt context tokens from a normal distribution of tokens (e.g., continuous prompts without a predefined word embedding). Moreover, in one or more embodiments, the localized context learning system utilizes learnable prompt context tokens as part of the vision language machine learning model. Furthermore, in one or more embodiments the localized context learning system during inference utilizes the prompt context tokens to generate localized context tokens and a subsequent text representation. Additionally, in one or more embodiments during training, the localized context learning system modifies the prompt context tokens based on a determined measure of loss.

In one or more embodiments, the localized context learning system determines alignment vectors. For example, the localized context learning system determines alignment vectors between prompt context tokens and conditional image patch tokens. In particular, the localized context learning system determines the alignment vectors by utilizing learned weights to compare the prompt context tokens with the conditional image patch tokens. Moreover, in some embodiments, the localized context learning system utilizes an alignment model to perform the comparison between the prompt context tokens and the conditional image patch tokens and to determine the alignment vectors.

In some embodiments, the localized context learning system generates context vectors. For example, the localized context learning system generates context vectors by combining the alignment vectors with the prompt context tokens. Accordingly, in some embodiments the context vectors of the localized context learning system include information contextual and localized to specific regions of the input digital image. Moreover, in one or more embodiments, the localized context learning system further generates localized context tokens. In particular, the localized context learning system generates the localized context tokens by combining the context vectors with the prompt tokens.

As mentioned above, in one or more embodiments, the localized context learning system modifies parameters of the vision language machine learning model. For example, the localized context learning system determines a measure of loss based on a comparison between the generated text representation (e.g., generated from the localized context tokens and a ground truth classifier of the input image) and an image feature vector of the input image. In particular, in some embodiments, the localized context learning system back-propagates the determined measure of loss to various parameters of the vision language machine learning model. For instance, the localized context learning system modifies parameters such as the prompt context tokens, and weights of an attention layer of the vision language machine learning model.

As mentioned above, many conventional systems suffer from a number of issues in relation to computational inaccuracy, and operational inflexibility. For example, some existing vision language models are inaccurate. For example, conventional vision language systems often inaccurately generate text predictions based on an input image. In particular, for text predictions, conventional vision language systems utilize global features of an input image. As such, conventional vision language systems fail to focus on the discriminative foreground of an input image, resulting in poor generalization to unseen classes (e.g., out of distribution test cases). Accordingly, conventional vision language systems generate inaccurate text predictions relative to an input image.

Further, due to conventional vision language systems utilizing global features of an input image, conventional vision language systems typically are unable to learn the semantic relevance of certain prompt vectors. For instance, conventional vision language systems weigh all prompt vectors equally which further leads to a failure of considering the contextual meaning of localized regions of an input image. Accordingly, due to the focus on global image features and equally weighing prompt vectors, conventional vision language systems are unable to generalize to unseen classes during inference time. Thus, conventional vision language systems generate inaccurate text predictions corresponding with an input image.

Relatedly, certain conventional vision language systems suffer from operational inflexibility. Indeed, for reasons similar to those described in relation to the inaccuracies of some prior systems, many prior systems are also rigidly limited to generating text predictions that focus on global image features. In particular, because some conventional vision language systems focus on global image features, conventional vision language systems are unable to adapt to input images that correspond with unseen classes (e.g., unseen classes during training). Moreover, because conventional vision language systems equally weigh prompts (e.g., consider input images as a whole), conventional vision language systems are limited in operational flexibility.

As suggested, one or more embodiments of the localized context learning system provides several advantages over conventional vision language systems. For example, in one or more embodiments, the localized context learning system improves accuracy over prior systems. For example, as mentioned, conventional vision language systems suffer from inaccuracy due to the focus on global image features. In one or more embodiments, the localized context learning system overcomes inaccuracy issues of conventional language systems by aligning prompt vectors to local image context and considering local image features. In particular, in some embodiments the localized context learning system generates image patch feature representations that represent patches from an input image. Further, in some embodiments, the localized context learning system generates localized context tokens from the image patch feature representations and prompt context tokens. Moreover, in some embodiments, the localized context learning system generates a text representation of the input image from localized context tokens. In one or more embodiments, by doing so, the localized context learning system accurately generates a text prediction based on localized context and localized relationships of an input image.

As mentioned, conventional text-image generation systems further suffer from inaccuracy due to the equal weighting of prompt vectors. For example, the localized context learning system overcomes the inaccuracy issues of conventional vision language systems by utilizing alignment vectors. In particular, in some embodiments the localized context learning system utilizes an attention layer of a vision language machine learning model to generate localized context tokens. For instance, in some embodiments, the localized context learning system determines alignment vectors between prompt context tokens and image patch feature representations. Further, in some embodiments, the localized context learning system generates context vectors by combining the alignment vectors and the prompt context tokens. Moreover, in some embodiments, the localized context learning system generates localized context tokens by combining the context vectors with the prompt context tokens. In some embodiments, by doing so, the localized context learning system overcomes the issue of equally weighing prompts by aligning prompt context tokens according to localized image features.

In addition to accuracy improvements, in one or more embodiments, the localized context learning system improves operational flexibility over prior systems. For reasons similar to those described in relation to the accuracy improvements, the localized context learning system can flexibly adapt the generation of text predictions for an input image with variation in content across different regions of the input image. Thus, in contrast to some prior systems that are rigidly fixed to generating text predictions focused on global image features, in one or more embodiments, the localized context learning system has a diverse capability to consider localized features of an input image and generate accurate text predictions.

Additional detail regarding the localized context learning system will now be provided with reference to the figures. For example, FIG. 1 illustrates a schematic diagram of an exemplary system environment 100 in which the localized context learning system 102 operates. As illustrated in FIG. 1, the system environment 100 includes a server(s) 106, a media management system 104, a network 108, a client device 110, and a client application 112.

Although the system environment 100 of FIG. 1 is depicted as having a particular number of components, the system environment 100 is capable of having a different number of additional or alternative components (e.g., a different number of servers, client devices, or other components in communication with the localized context learning system 102 via the network 108). Similarly, although FIG. 1 illustrates a particular arrangement of the server(s) 106, the network 108, and the client device 110, various additional arrangements are possible.

The server(s) 106, the network 108, and the client device 110 are communicatively coupled with each other either directly or indirectly (e.g., through the network 108 discussed in greater detail below in relation to FIG. 10). Moreover, the server(s) 106 and the client device 110 include one or more of a variety of computing devices (including one or more computing devices as discussed in greater detail in relation to FIG. 10).

As mentioned above, the system environment 100 includes the server(s) 106. In one or more embodiments, the server(s) 106 processes input images from a user of the client application 112 to generate a text representation. In one or more embodiments, the server(s) 106 comprises a data server. In some implementations, the server(s) 106 comprises a communication server or a web-hosting server.

In one or more embodiments, the client device 110 includes a computing device that is able to generate and/or provide, for display, a text representation corresponding with an input image on the client application 112. For example, the client device 110 includes smartphones, tablets, desktop computers, laptop computers, head-mounted-display devices, or other electronic devices. The client device 110 includes one or more applications (e.g., a text prediction generation application) for processing input images in accordance with the media management system 104. For example, in one or more embodiments, the client application 112 works in tandem with the localized context learning system 102 to process input images utilizing a vision language machine learning model to generate a text representation. In particular, the client application 112 includes a software application installed on the client device 110. Additionally, or alternatively, the client application 112 of the client device 110 includes a software application hosted on the server(s) 106 which may be accessed by the client device 110 through another application, such as a web browser.

To provide an example implementation, in some embodiments, the localized context learning system 102 on the server(s) 106 supports the localized context learning system 102 on the client device 110. For instance, in some cases, the media management system 104 on the server(s) 106 gathers data for the localized context learning system 102. In response, the localized context learning system 102, via the server(s) 106, provides the information to the client device 110. In other words, the client device 110 obtains (e.g., downloads) the localized context learning system 102 from the server(s) 106. Once downloaded, the localized context learning system 102 on the client device 110 generates text predictions and/or learns parameters based on localized context of input images.

In alternative implementations, the localized context learning system 102 includes a web hosting application that allows the client device 110 to interact with content and services hosted on the server(s) 106. To illustrate, in one or more implementations, the client device 110 accesses a software application supported by the server(s) 106. In response, the localized context learning system 102 on the server(s) 106, trains a vision language machine learning model and generates text representations at inference. The server(s) 106 then provides the text representation to the client device 110 for display.

To illustrate, in some cases, the localized context learning system 102 on the client device 110 receives an input image. The client device 110 transmits the input image to the server(s) 106. In response, the localized context learning system 102 on the server(s) 106 utilizes a vision language machine learning model to generate a text representation.

Indeed, in some embodiments, the localized context learning system 102 is implemented in whole, or in part, by the individual elements of the system environment 100. For instance, although FIG. 1 illustrates the localized context learning system 102 implemented or hosted on the server(s) 106, different components of the localized context learning system 102 are able to be implemented by a variety of devices within the system environment 100. For example, one or more (or all) components of the localized context learning system 102 are implemented by a different computing device (e.g., the client device 110) or a separate server from the server(s) 106. Indeed, as shown in FIG. 1, the client device 110 includes the localized context learning system 102. Example components of the localized context learning system 102 will be described below with regard to FIG. 8.

Figure 2:
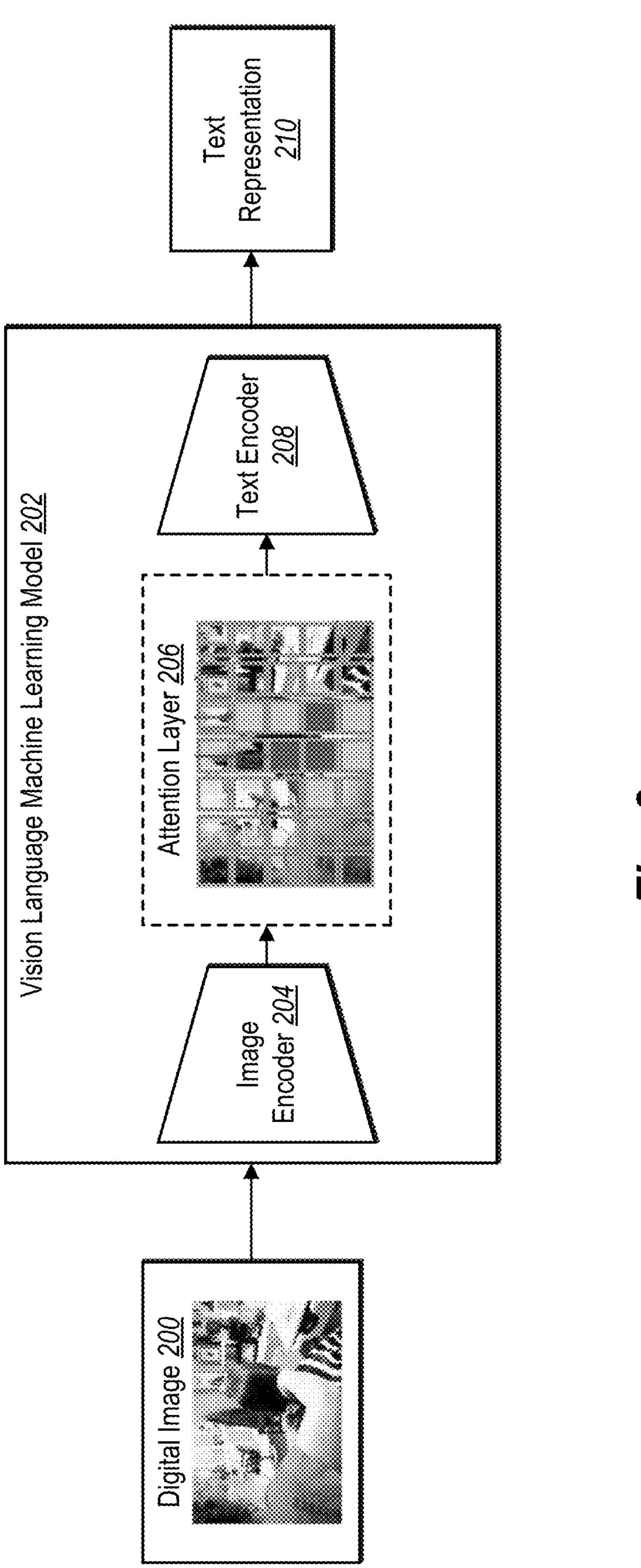
FIG. 2 illustrates an overview of the localized context learning system generating a text representation from an input image in accordance with one or more embodiments.

As mentioned above, in certain embodiments, the localized context learning system 102 generates a text representation from an input image. FIG. 2 illustrates an overview of the localized context learning system 102 generating a text representation utilizing a vision language machine learning model in accordance with one or more embodiments.

For example, FIG. 2 shows the localized context learning system 102 processing a digital image 200. In particular, the digital image 200 in FIG. 2 shows a person receiving a haircut from a hairdresser in a hair salon. In one or more embodiments, the localized context learning system 102 receives the digital image 200 from a client device utilizing a client application. Further, the digital image 200 includes various pictorial elements. In particular, the pictorial elements include pixel values that define the spatial and visual aspects of the digital image 200. Furthermore, the localized context learning system 102 receives the digital image 200 uploaded or selected from various image editing platforms.

In one or more embodiments, the localized context learning system 102 utilizes a machine learning model to process the digital image 200. For example, a machine learning model includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

As mentioned, FIG. 2 shows the localized context learning system 102 utilizing a vision language machine learning model 202 to process the digital image 200. In one or more embodiments, the vision language machine learning model 202 includes a model for understanding and analyzing visual and textual information. For example, the localized context learning system 102 via the vision language machine learning model 202 extracts information from visual data and generates textual information from the extracted visual data. In particular, in one or more embodiments, the localized context learning system 102 via the vision language machine learning model 202 generates visual or textual outputs, depending on the task at hand. For instance, in one or more embodiments, the localized context learning system 102 via the vision language machine learning model 202 processes the digital image 200 and outputs a textual description of the digital image such as "haircut at a salon." In some instances, the localized context learning system 102 via the vision language machine learning model 202 processes textual queries in tandem with the digital image 200 such as "what is happening in the image?" In processing a textual query, the localized context learning system via the vision language machine learning model generates a textual output to respond to the textual query (e.g., a haircut).

Further, as shown in FIG. 2, the localized context learning system 102 utilizes the vision language machine learning model 202 implemented with an image encoder 204. In particular, FIG. 2 shows the localized context learning system 102 processing the digital image 200 with the image encoder 204. In one or more embodiments, the localized context learning system 102 implements the image encoder 204 as a component of a neural network (or one or more layers of a neural network) that extract/encode/embed features relating to digital images, e.g., in this instance relating to localized features of the digital image 200. For example, the image encoder 204 can include a particular number of layers including one or more fully connected and/or partially connected layers of neurons that extract image patches from the digital image 200 and encode localized features of the digital image 200.

As just mentioned, the localized context learning system 102 implements the image encoder 204 as a component of a neural network. In one or more embodiments, a neural network includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components.

Moreover, FIG. 2 shows the localized context learning system 102 implementing the vision language machine learning model 202 that includes an attention layer 206. For example, FIG. 2 shows the localized context learning system 102 utilizing the attention layer 206 to process an output of the image encoder 204. In one or more embodiments, the localized context learning system 102 utilizes the attention layer 206 of the vision language machine learning model 202 to generate localized context tokens. For instance, the localized context learning system 102 utilizes the attention layer 206 to assist the vision language machine learning model 202 in attending to specific portions of input data (e.g., the input digital image). In particular, the localized context learning system 102 utilizes the attention layer 206 to focus on localized regions of the digital image 200 when generating localized context tokens. Additional details relating to the attention layer 206 is given below in the description of FIGS. 3-5.

Furthermore, FIG. 2 shows the localized context learning system 102 implementing a text encoder 208 as part of the vision language machine learning model 202. For example, FIG. 2 shows the localized context learning system 102 utilizing the text encoder 208 to process an output of the attention layer 206. In one or more embodiments, the localized context learning system 102 utilizes the text encoder 208 which acts as a component of a neural network to transform textual data (e.g., the localized context tokens) into a numerical representation. For instance, the localized context learning system 102 utilizes the text encoder 208 to transform localized context tokens into a text vector representation. Further, in some embodiments, the localized context learning system 102 utilizes the text encoder 208 to generate a text representation 210 that corresponds with the digital image 200.

As mentioned, in one or more embodiments, the localized context learning system 102 generates the text representation 210. For instance, the text representation 210 includes a textual prediction (or encoding/embedding) that corresponds with an input digital image. Further, the text representation 210 can include a word or a series of words (or vector representations of words or series of words) that corresponds with the input digital image. Moreover, in some instances, the text representation corresponds with an input digital image and a textual query. For example, the text representation 210 responds to a received textual query received in tandem or after receiving the digital image 200.

In one or more embodiments, the localized context learning system 102 utilizes the vision language machine learning model 202 to align natural language supervision and image representation learning in a single embedding space. In particular, the localized context learning system 102 implements the methods described in Chao Jia, Yinfei Yang, Ye Xia, Yi-Ting Chen, Zarana Parekh, Hieu Pham, Quoc V. Le, Yun-Hsuan Sung, Zhen Li, and Tom Duerig. Scaling up visual and vision-language representation learning with noisy text supervision. In Marina Meila and Tong Zhang, editors, Proceedings of the 38th International Conference on Machine Learning, ICML 2021, 18-24 Jul. 2021, Virtual Event, volume 139 of Proceedings of Machine Learning Research, pages 4904-4916. PMLR, 2021; and Alec Radford, Jong Wook Kim, Chris Hallacy, Aditya Ramesh, Gabriel Goh, Sandhini Agarwal, Girish Sastry, Amanda Askell, Pamela Mishkin, Jack Clark, Gretchen Krueger, and Ilya Sutskever. Learning transferable visual models from natural language supervision. In Marina Meila and Tong Zhang, editors, Proceedings of the 38th International Conference on Machine Learning, ICML 2021, 18-24 Jul. 2021, Virtual Event, volume 139 of Proceedings of Machine Learning Research, pages 8748-8763. PMLR, 2021. which are both incorporated by reference in their entirety herein. Unlike the foregoing references, in one or more implementations, the localized context learning system 102 utilizes the attention layer 206 to generate localized context tokens (rather than global tokens).

Figure 3:
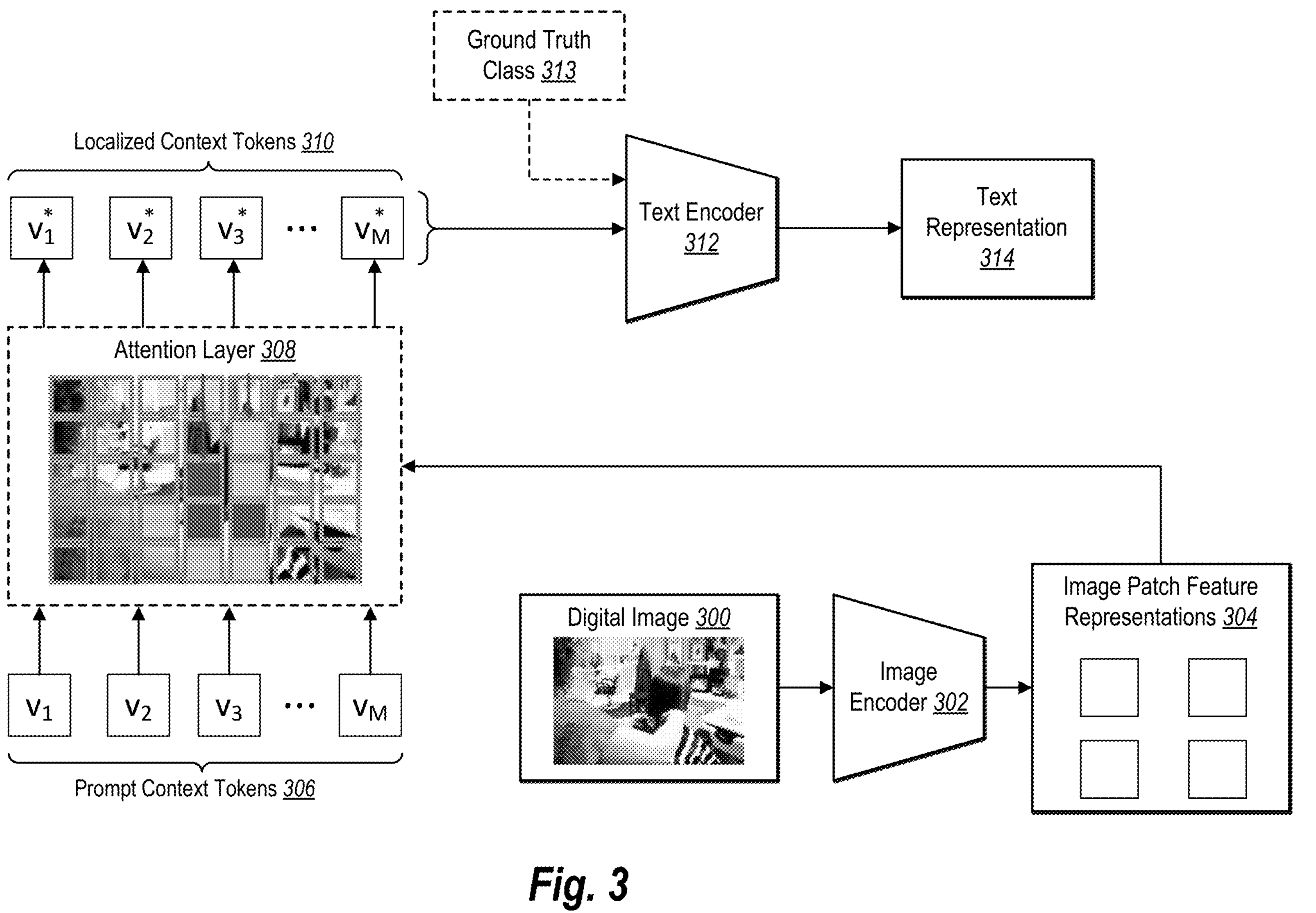
FIG. 3 illustrates a diagram of the localized context learning system generating image patch feature representations in accordance with one or more embodiments.

As mentioned above, in certain embodiments, the localized context learning system 102 generates image patch feature representations. FIG. 3 illustrates the localized context learning system 102 generating image patch feature representations to further generate localized context tokens in accordance with one or more embodiments.

As mentioned above, the localized context learning system 102 processes a digital image 300 with an image encoder 302. Further, FIG. 3 shows the localized context learning system 102 utilizing the image encoder 302 to generate image patch feature representations 304. To generate the image patch feature representations 304, in one or more embodiments, the localized context learning system 102 extracts image patches from the digital image 300. In particular, image patches include sub-dividing the digital image 300 into smaller regions. For instance, the localized context learning system 102 sub-divides the digital image 300 into patches, where each patch represents localized regions within the digital image 300. Furthermore, in one or more embodiments, an image patch does not share any pixel values with other image patches. In some embodiments, an image patch overlaps with pixel values of an adjacent image patch. Accordingly, in one or more embodiments, the localized context learning system 102 sub-divides the digital image 300 into image patches where some of the image patches do not overlap with pixel values of other image patches and some of the image patches do overlap with pixel values of other image patches. In other words, in some embodiments, the image patches includes both overlapping image patches and non-overlapping image patches.

As just mentioned, the localized context learning system 102 extracts the image patches from the digital image 300. Further, in one or more embodiments, the localized context learning system 102 extracts the image patches and generates image patch feature representations 304 from the extracted image patches. In particular, the localized context learning system 102 utilizes the image encoder 302 to generate the image patch feature representations 304. For instance, each image patch feature representation corresponds with an image patch and represents the visual features within a localized region of the digital image 300. Further, in one or more embodiments, the image patch feature representations 304 includes a vector embedding and/or a token representation.

In one or more embodiments, the localized context learning system 102 implements the image encoder 302 with Vision Transformer (ViT) architecture. In particular, the localized context learning system 102 utilizes the ViT architecture to produce local (e.g., at the image patch level) as well as global image features. To illustrate, in one or more embodiments, the localized context learning system 102 implements the methods described in Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, Jakob Uszkoreit, and Neil Houlsby. An image is worth 16×16 words: Transformers for image recognition at scale. In 9th International Conference on Learning Representations, ICLR 2021, Virtual Event, Austria, May 3-7, 2021. OpenReview.net, 2021., which is fully incorporated by reference herein.

FIG. 3 shows the localized context learning system 102 utilizing an attention layer 308. For example, FIG. 3 shows the localized context learning system 102 utilizing the attention layer 308 to process the image patch feature representations 304 and prompt context tokens 306. In one or more embodiments, the localized context learning system 102 utilizes the prompt context tokens 306 as parameters of the vision language machine learning model. For instance, the localized context learning system 102 arbitrarily initializes the prompt context tokens from a normal distribution space and utilizes the prompt context tokens 306 as learnable parameters of the vision language machine learning model. Further, in some embodiments, the localized context learning system 102 pulls the prompt context tokens 306 from a normal distribution that includes prompt tokens without any predefined word embedding meanings (e.g., continuous prompts).

As shown in FIG. 3, the localized context learning system 102 generates localized context tokens 310. For example, the localized context learning system 102 generates the localized context tokens based on the prompt context tokens 306 and the image patch feature representations 304 via the attention layer 308. In particular, the localized context tokens 310 represent tokens indicative of the image patches of the digital image 300. For instance, the localized context learning system 102 utilizes the localized context tokens 310 as a reference point to condition the vision language machine learning model in generating a text output. The localized context learning system 102 utilizes the localized context tokens 310 to guide the vision language machine learning model to provide relevant context or constraints in generating a textual output. In this instance, the localized context learning system 102 guides the vision language machine learning model in generating a textual output guided by the localized features of the digital image.

Furthermore, FIG. 3 shows the localized context learning system 102 utilizing a text encoder 312 to generate a text representation 314. As further shown in FIG. 3, the localized context learning system 102 optionally feeds as input into the text encoder 312 a ground truth class 313. For example, the ground truth class 313 corresponds with the digital image 300. In particular, in some embodiments the localized context learning system 102 trains the vision language machine learning model by generating the text representation 314 from the localized context tokens 310 and the ground truth class 313. Further, the localized context learning system 102 combines the ground truth class 313 and the localized context tokens 310 for processing by the text encoder 312. In particular, in some embodiments, the localized context learning system 102 concatenates the ground truth class 313 and the localized context tokens 310. For instance, if the digital image 300 depicts a dog, the localized context learning system 102 utilizes a text encoder 312 to process the localized context tokens 310 and the ground truth class 313 of "dog."

In one or more embodiments, the localized context learning system 102 implements the text encoder 312 as a transformer model. In particular, the localized context learning system 102 utilizes the transformer model to take word sequences as input and produce both individual sequence-level as well as overall sentence-level representations. To illustrate, the localized context learning system 102 implements the methods described in Ashish Vaswani, Noam Shazeer, Niki Parmar, Jakob Uszkoreit, Llion Jones, Aidan N. Gomez, Lukasz Kaiser, and Illia Polosukhin. Attention is all you need. In Isabelle Guyon, Ulrike von Luxburg, Samy Bengio, Hanna M. Wallach, Rob Fergus, S. V. N. Vishwanathan, and Roman Garnett, editors, Advances in Neural Information Processing Systems 30: Annual Conference on Neural Information Processing Systems 2017 Dec. 4-9, 2017, Long Beach, CA, USA, pages 5998-6008, 2017, which is fully incorporated by reference herein.

In one or more embodiments, the localized context learning system 102 implements contrastive language-image pretraining (CLIP) as part of the vision language machine learning model. For example, CLIP includes the image encoder 302 and the text encoder 312 as shown in FIG. 3. In particular, CLIP includes an objective function of aligning the output of the image encoder 302 with the output of the text encoder 312. For instance, the localized context learning system 102 utilizes CLIP to determine a cosine similarity between the related text output (e.g., the text representation 314) and the input image (e.g., the digital image 300). Further, the localized context learning system 102 utilizes CLIP to maximize the cosine similarity between the related text output and the input image. Whereas for unrelated pairs of text and image, the localized context learning system 102 minimizes the cosine similarity.

As mentioned above, the localized context learning system 102 in one or more embodiments implements CLIP as the architecture for the image encoder 302 and the text encoder 312. Rather than implementing CLIP, in one or more embodiments, the localized context learning system 102 implements VisualBERT as described in Liunian Harold Li, Mark Yatskar, Da Yin, Cho-Jui Hsieh, and Kai-Wei Chang. Visualbert: A simple and performant baseline for vision and language. CoRR, abs/1908.03557, 2019, which is fully incorporated by reference herein.

Further, in other embodiments, the localized context learning system 102 implements MDETR as described in Aishwarya Kamath, Mannat Singh, Yann LeCun, Gabriel Synnaeve, Ishan Misra, and Nicolas Carion. MDETR-modulated detection for end-to-end multi-modal understanding. In 2021 IEEE/CVF International Conference on Computer Vision, ICCV 2021, Montreal, QC, Canada, Oct. 10-17, 2021, pages 1760-1770. IEEE, 2021, which is fully incorporated by reference herein. Moreover, in other embodiments, the localized context learning system 102 implements GLIP as described in Liunian Harold Li, Pengchuan Zhang, Haotian Zhang, Jianwei Yang, Chunyuan Li, Yiwu Zhong, Lijuan Wang, Lu Yuan, Lei Zhang, Jenq-Neng Hwang, Kai-Wei Chang, and Jianfeng Gao. Grounded language-image pre-training. In IEEE/CVF Conference on Computer Vision and Pattern Recognition, CVPR 2022, New Orleans, LA, USA, Jun. 18-24, 2022, pages 10955-10965. IEEE, 2022, which is fully incorporated by reference herein.

Figure 4A:
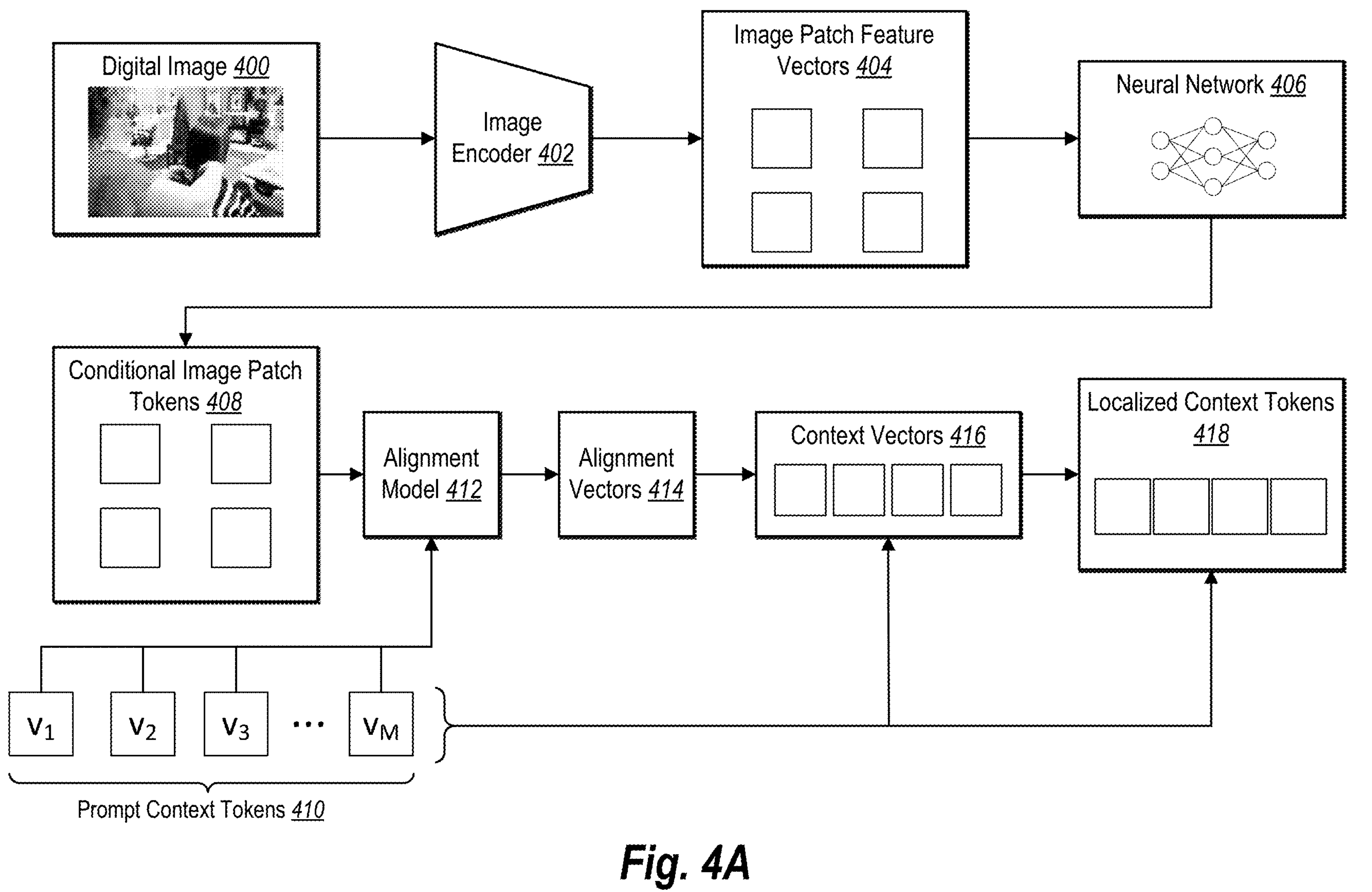
FIG. 4A illustrates a diagram of the localized context learning system generating context vectors utilizing an alignment model in accordance with one or more embodiments.

As mentioned above, the localized context learning system 102 generates context vectors to further generate localized context tokens. FIG. 4A shows the localized context learning system 102 generating context vectors in accordance with one or more embodiments. FIG. 4A illustrates the localized context learning system 102 processing a digital image 400 by utilizing an image encoder 402, which was discussed above.

As mentioned above, the localized context learning system 102 generates an image patch feature representation. For instance, the localized context learning system 102 generates the image patch feature vectors 404. FIG. 4A shows the localized context learning system 102 generating the image patch feature vectors 404 from the digital image 400 by utilizing the image encoder 402. In particular, the localized context learning system 102 generates the image patch feature vectors 404 based on the extracted image patches from the digital image 400. For instance, the image patch feature vectors 404 represent elements from the image patches. The image patch feature vectors 404 represent the image patches as a vector or a set of vectors in a lower-dimensional space. Moreover, once the localized context learning system 102 has generated the image patch feature vectors 404, the localized context learning system 102 further utilizes the image patch feature vectors 404 for additional downstream tasks.

Moreover, FIG. 4A shows the localized context learning system 102 processing the image patch feature vectors 404 with a neural network 406. For example, the localized context learning system 102 utilizes a lightweight neural network to process the image patch feature vectors 404. In particular, the localized context learning system 102 utilizes a pretrained lightweight neural network, pretrained to generate conditional image patch tokens 408. To illustrate, the localized context learning system 102 implements meta-net as described in Kaiyang Zhou, Jingkang Yang, Chen Change Loy, and Ziwei Liu. Conditional prompt learning for vision-language models. In IEEE/CVF Conference on Computer Vision and Pattern Recognition, CVPR 2022, New Orleans, LA, USA, Jun. 18-24, 2022, pages 16795-16804. IEEE, 2022, which is fully incorporated by reference herein.

As just mentioned, the localized context learning system 102 utilizes the neural network 406 to generate the conditional image patch tokens 408. In one or more embodiments, the localized context learning system 102 generates the conditional image patch tokens 408 from the image patch feature vectors 404. In particular, the localized context learning system 102 utilizes the neural network 406 to process the image patch feature vectors 404 and generate the conditional image patch tokens 408. Moreover, the localized context learning system 102 utilizes the neural network 406 to generate a conditional image patch token for each image patch. In one or more embodiments, the conditional image patch tokens 408 include conditioning or guiding a model to generate tokens based on specific criteria or context. In this instance, the localized context learning system 102 utilizes the conditional image patch tokens 408 to guide the generation of tokens specific to localized context of the digital image 400. For instance, the localized context learning system 102 converts a vector representation into a language token representation.

Further, FIG. 4A shows the localized context learning system 102 utilizing an alignment model 412. Specifically, FIG. 4A shows the localized context learning system 102 utilizing the alignment model 412 to process the conditional image patch tokens 408 and prompt context tokens 410. In one or more embodiments, the alignment model 412 includes learned weights. Moreover, the localized context learning system 102 processes the conditional image patch tokens 408 with the prompt context tokens 410 to align the two types of tokens utilizing the learned weights.

Further, FIG. 4A shows the localized context learning system 102 utilizing the alignment model 412 to generate alignment vectors 414. In one or more embodiments, the localized context learning system 102 determines the alignment vectors 414 between the prompt context tokens 410 and the conditional image patch tokens 408. For instance, the localized context learning system 102 determines the alignment vectors 414 by using the learned weights of the alignment model 412 to compare the prompt context tokens 410 with the conditional image patch tokens 408. Accordingly, the alignment vectors 414 determined by the localized context learning system 102 include vector representations that weigh the prompt context tokens 410 according to the image patch features (e.g., by utilizing the conditional image patch tokens 408).

Moreover, FIG. 4A shows the localized context learning system 102 generating context vectors 416. For example, FIG. 4A shows the localized context learning system 102 generating the context vectors 416 from the alignment vectors 414 and the prompt context tokens 410. In particular, the localized context learning system 102 generates the context vectors 416 for image patches of the digital image 400 by combining the alignment vectors 414 and the prompt context tokens 410. The context vectors 416 represent elements from the image patches in combination with the prompt context tokens 410 in a lower-dimensional space. To illustrate, the localized context learning system 102 implements the methods described in Thang Luong, Hieu Pham, and Christopher D. Manning. Effective approaches to attention-based neural machine translation. In Llu'is M'arquez, Chris Callison-Burch, Jian Su, Daniele Pighin, and Yuval Marton, editors, Proceedings of the 2015 Conference on Empirical Methods in Natural Language Processing, EMNLP 2015, Lisbon, Portugal, Sep. 17-21, 2015, pages 1412-1421. The Association for Computational Linguistics, 2015. Subhransu Maji, Esa Rahtu, Juho Kannala, Matthew B. Blaschko, and Andrea Vedaldi. Fine-grained visual classification of aircraft. CoRR, abs/1306.5151, 2013 to generate context vectors 416, which is fully incorporated by reference herein. Moreover, as shown the localized context learning system 102 utilizes the context vectors 416 to further generate localized context tokens 418, which was previously discussed above.

In one or more embodiments, the localized context learning system 102 represents the digital image 400 as:

$$\mathbb{S} \in \mathbb{R}^{P \times B \times D}$$

Where $\mathbb{s}$ represents the digital image 400 P represents the number of image patches from the digital image 400, B represents a training batch size, and D represents the feature dimensionality.

Further, in one or more embodiments, the localized context learning system 102 represents generating the conditional image patch tokens 408 for the image patches as:

$$\mathbb{S}_p = h_\theta(\mathbb{S}_p)$$
$$p \in \{1, 2, \ldots, P\}$$

In particular, the first notation above represents the digital image 400 as s and where $s_p$ represents an image patch of the digital image 400. Further, $h_\theta$ indicates a set of parameter values of the neural network 406 to generate the conditional image patch tokens 408. Moreover, the second notation indicates that p spans the range of each the image patches of the digital image 400. Thus, if the digital image 400 contains twenty image patches, the localized context learning system 102 determines a conditional image patch token for each of the twenty image patches. In one or more embodiments, because the localized context learning system 102 generates a conditional image patch token for each image patch, back-propagation during training is efficient and easily identifiable. In other words, each conditional image patch token corresponds with a single image patch and thus the localized context learning system 102 easily differentiates which parameters to modify during training.

Moreover, in one or more embodiments, the localized context learning system 102 represents the alignment vectors 414 as:

$$a_p(\alpha \in \mathbb{R}^{B \times M \times d})$$

In particular, in some embodiments, $a_p$ indicates an alignment vector for a specific image patch of the digital image 400.

Furthermore, in one or more embodiments, the localized context learning system 102 represents determining the alignment vectors 414 (e.g., for each image patch) as:

$$a_p = \text{align}(\mathbb{s}_p, v_i)$$
$$i \in \{1, 2, \ldots, M\} = \exp(\text{score}(\mathbb{s}_p, v_i)) \Big/ \sum \text{score}(\mathbb{s}_p, v_i)$$

In particular, in some embodiments, the first notation indicates that the localized context learning system 102 determines the alignment vector for an image patch by performing an align function for the image patch and a prompt context token ($v_i$). Moreover, as indicated by the second notation, i includes the range spanning all the prompt context tokens. Thus, the localized context learning system 102 determines an alignment vector by utilizing the align function for each pair of image patch and prompt context token. Furthermore, as indicated by the third notation, the localized context learning system 102 determines the alignment vector by utilizing a score function on a pair of an image patch and a prompt context token.

Moreover, in some embodiments, the localized context learning system 102 implements the score function (score ( ) as:

$$\text{score}(\mathbb{S}_p, v_i) = \tanh(W_a[\mathbb{S}_p; v_i])$$

In particular, in some embodiments, the localized context learning system 102 determines the score of the image patch and prompt context token pair by taken the hyperbolic tangent function (e.g., maps real numbers to values between −1 and 1). For instance, the localized context learning system 102 determines the hyperbolic tangent function of a learned weight (e.g., learned weight of the alignment model 412 for an alignment vector) for the specific pair of interest.

Further, in some embodiments, the localized context learning system 102 represents generating context vectors 416 as:

$$c_p = \sum_{i=1}^{M} a_{pi} v_i$$

In particular, in some embodiments, the localized context learning system 102 determines a context vector per image patch. For instance, the localized context learning system 102 generates a context vector by determining the weighted sum (according to the alignment weights) over all prompt context tokens.

Moreover, in one or more embodiments the localized context learning system 102 represents generating the localized context tokens as:

$$v_m = \sum_{i=1}^{p} v_m + c_i$$

In particular, in some embodiments, the localized context learning system 102 generates a localized context token by taking the summation of a prompt context token and each of the context vectors.

In context of the above, in one or more embodiments, the localized context learning system 102 determines prompt context tokens for an i-th class as $t_i=[v_1(x), v_2(x), \ldots, v_M(x), cl_i]$, where $cl_i$ is the i-th class. Furthermore, the localized context learning system 102 determines a prediction probability for further determining a text representation, represented as:

$$p(y \mid x) = \frac{\exp(sim(x, g(t_y(x))))/\gamma}{\sum_{i=1}^{k} \exp(sim(x, g(t_i(x))))/\gamma}$$

In particular, in the above notation, g( ) represents the localized context learning system 102 generating a feature vector via a text encoder. Further, x indicates the localized context learning system 102 generating an image feature vector via the image encoder 402 from the digital image 400. Moreover, γ indicates a temperature parameter. For instance, for generating a text representation (e.g., a text prediction based on the digital image 400), the localized context learning system 102 frames the determination as a K-class classification problem. For example, the K-class classification problem represents classifying input data into an exclusive class or category, where K represents the number of distinct classes. Moreover, the temperature parameter indicates a softmax-based classifier utilized to convert outputs into probabilities for each of the K classes. Accordingly, the localized context learning system 102 generates a prediction probability for each class of K for an image feature vector corresponding with a certain class.

Figure 4B:
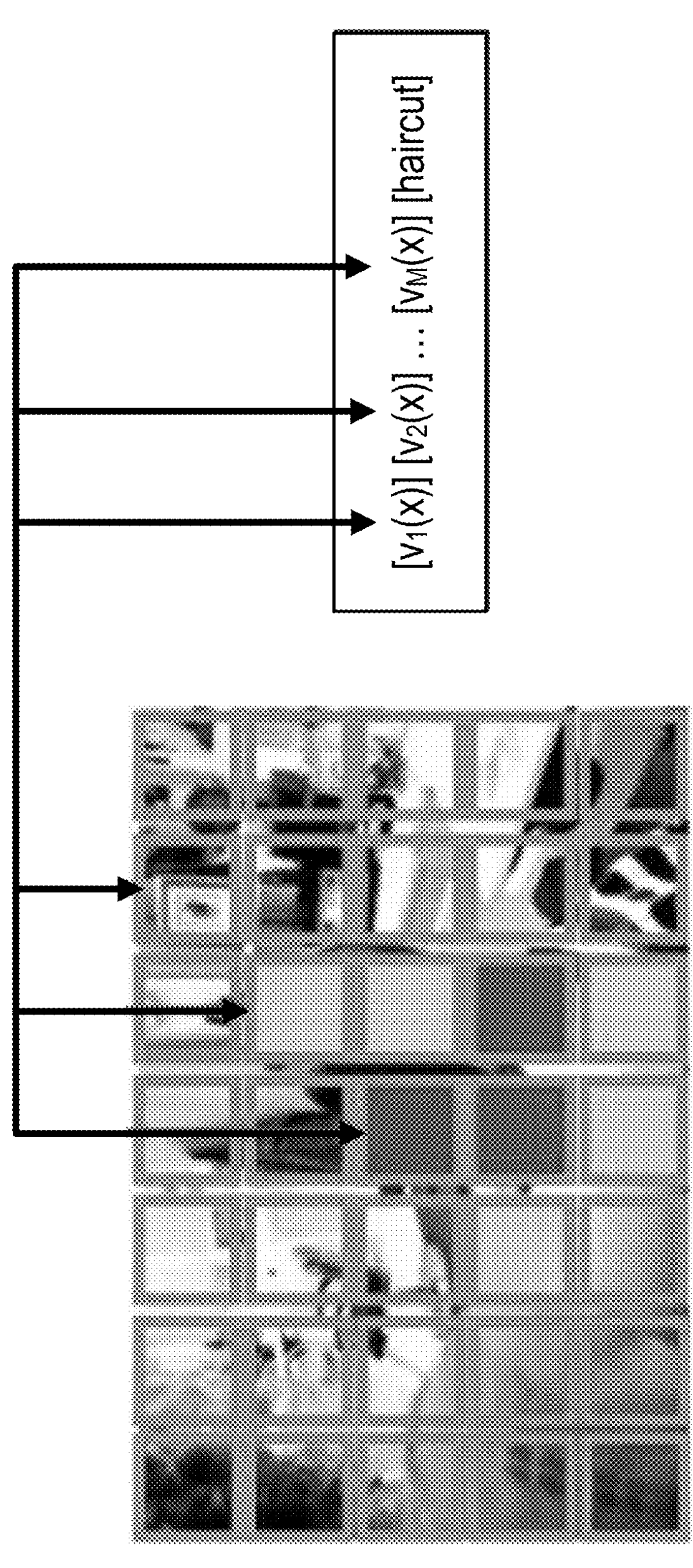
FIG. 4B illustrates the localized context learning system aligning prompt context tokens with localized regions of an input digital image in accordance with one or more embodiments.

As mentioned above, the localized context learning system 102 aligns prompt context tokens with localized regions of an input image. FIG. 4B shows the localized context learning system 102 utilizing an alignment model within an attention layer of the vision language machine learning model. For example, rather than equally weighting prompt context tokens, as shown in FIG. 4B, the localized context learning system 102 appropriately weighs prompt context tokens according to localized regions of the input image to semantically reflect the actual content of the input image. In particular, the localized context learning system 102 aligns each image patch feature vector to the prompt context tokens (e.g., a set of dynamic soft prompts). To illustrate, FIG. 4B shows during training of the vision language machine learning model, the localized context learning system 102 aligns the prompt context tokens with a specific region of the input image and also processes a ground truth classifier (e.g., [haircut]) that corresponds with the input image.

Figure 5:
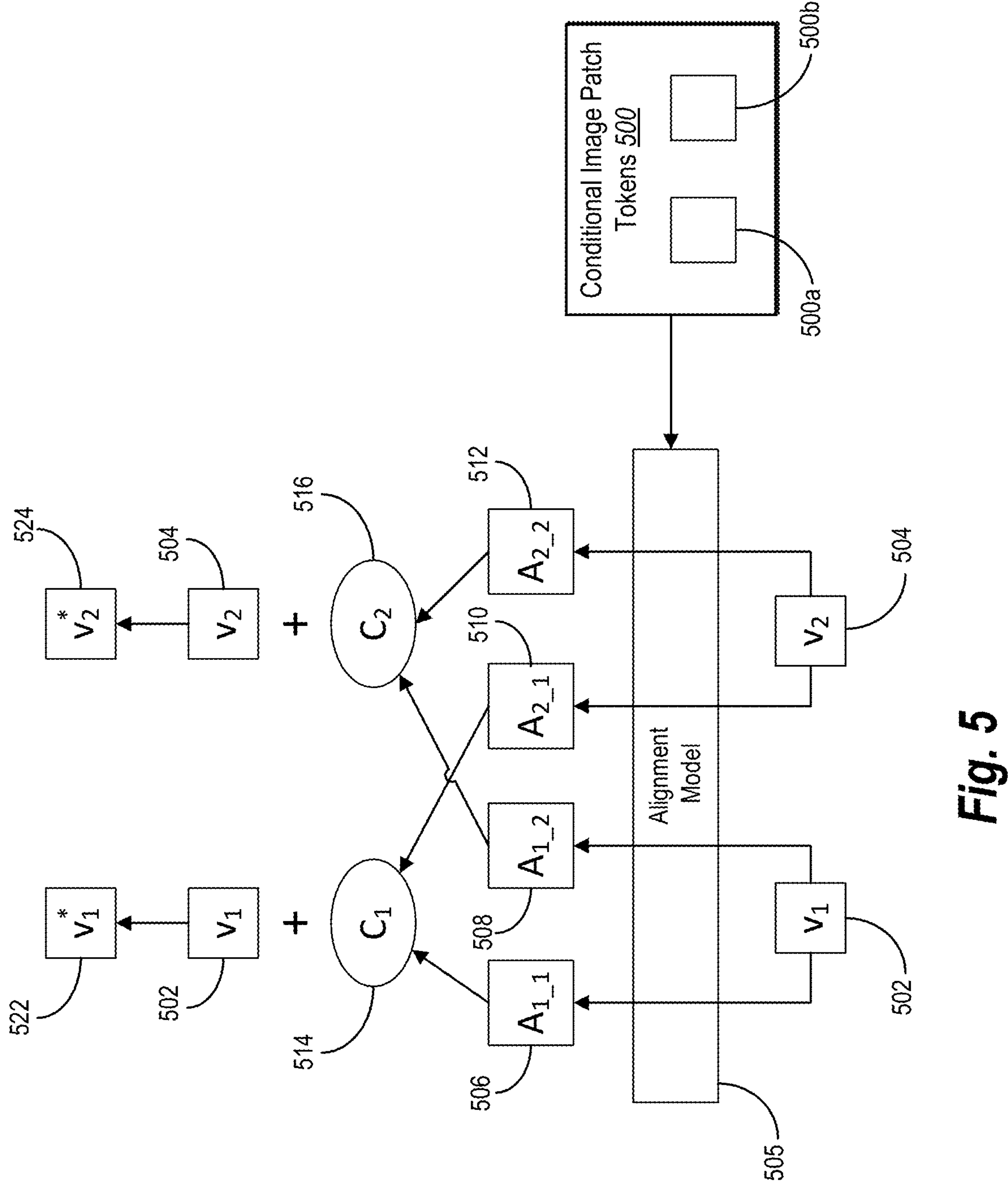
FIG. 5 illustrates a diagram of the localized context learning system generating localized context tokens in accordance with one or more embodiments.

As mentioned above, the localized context learning system 102 generates localized context tokens. The localized context learning system 102 generates localized context tokens from the prompt context tokens and the image patch feature representations in accordance with one or more embodiments. For example, FIG. 5 shows the localized context learning system 102 generating a first alignment vector 506. In particular, the localized context learning system 102 generates the first alignment vector 506 from conditional image patch tokens 500 which includes a first prompt context token 502 and a first conditional image patch token 500*a*. For instance, the localized context learning system 102 compares the first prompt context token 502 with the first conditional image patch token 500*a* utilizing a first learned weight of alignment model 505.

Moreover, FIG. 5 shows the localized context learning system 102 generating a second alignment vector 508. In particular, the localized context learning system 102 generates the second alignment vector 508 from the first prompt context token 502 and a second conditional image patch token 500*b*. Further, FIG. 5 shows the localized context learning system 102 generating a third alignment vector 510. In particular, the localized context learning system 102 generates the third alignment vector 510 from a second prompt context token 504 and the first conditional image patch token 500*a*. Additionally, FIG. 5 shows the localized context learning system 102 generating a fourth alignment vector 512. In particular, the localized context learning system 102 generates the fourth alignment vector 512 from the second prompt context token 504 and the second conditional image patch token 500*b*.

As further shown in FIG. 5, the localized context learning system 102 generates a first context vector 514. In particular, the localized context learning system 102 generates the first context vector 514 by combining the first alignment vector 506 with the third alignment vector 510. Of note, the first alignment vector 506 and the third alignment vector 510 both correspond with the first conditional image patch token 500*a*. Additionally, FIG. 5 shows the localized context learning system 102 generating a second context vector 516. In particular, the localized context learning system 102 generates the second context vector 516 by combining the second alignment vector 508 with the fourth alignment vector 512.

Moreover, FIG. 5 shows the localized context learning system 102 generating a first localized context token 522. In particular, the localized context learning system 102 generates the first localized context token 522 by combining the first context vector 514 with the first prompt context token 502. Similarly, the localized context learning system 102 generates a second localized context token 524. In particular, the localized context learning system 102 generates the second localized context token 524 by combining the second context vector 516 with the second prompt context token 504.

Although FIG. 5 shows two prompt context tokens and two conditional image patch tokens, in one or more embodiments, the localized context learning system 102 processes more than two prompt context tokens and conditional image patch tokens to generate more than two localized context tokens in a similar manner described above.

Figure 6:
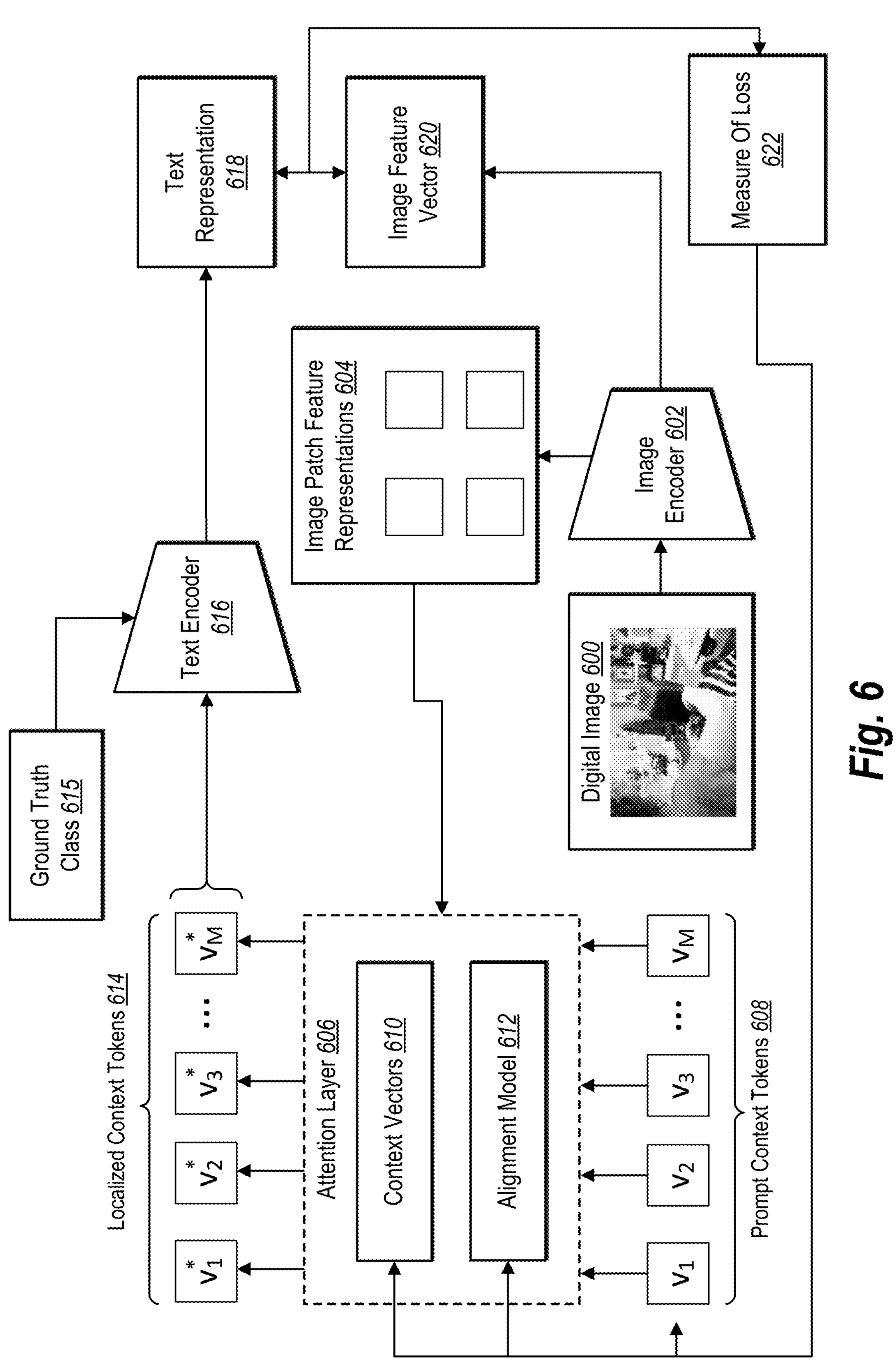
FIG. 6 illustrates a diagram of the localized context learning system modifying parameters of a vision language machine learning model in accordance with one or more embodiments.

As mentioned above, the localized context learning system 102 modifies parameters of the vision language machine learning model. The localized context learning system 102 modifies various components of the vision language machine learning model in accordance with one or more embodiments. For example, FIG. 6 shows the localized context learning system 102 processing a digital image 600 via an image encoder 602 to generate image patch feature representations 604. Moreover, FIG. 6 shows the localized context learning system 102 generating localized context tokens 614 from prompt context tokens 608 and image patch feature representations 604. Further, FIG. 6 shows the localized context learning system 102 utilizing a ground truth class 615. In addition, the localized context learning system 102 generates a text representation 618 via a text encoder 6216 from the localized context tokens 614 and the ground truth class 615.

Moreover, FIG. 6 shows the localized context learning system 102 generating an image feature vector 620 via the image encoder 602 from the digital image 600. For instance, in contrast to the image patch feature representations 604, the image feature vector 620 represents the digital image 600 as a whole (e.g., globally). During training, the localized context learning system 102 utilizes the image feature vector 620 for comparison against the text representation 618.

As shown in FIG. 6, the localized context learning system 102 compares the image feature vector 620 against the text representation 618 to determine a measure of loss 622. In one or more embodiments, the localized context learning system 102 the determined measure of loss 622 includes a contrastive loss function, mean squared error loss, cross-entropy loss, Kullback-Leibler divergence loss, or hinge loss.

Furthermore, FIG. 6 shows the localized context learning system 102 back-propagating the measure of loss 622. In particular, the localized context learning system 102 back-propagates the measure of loss 622 to the prompt context tokens 608, the alignment model 612 (e.g., weights of the alignment model 612), and the context vectors 610 of an attention layer 606. Moreover, in one or more embodiments, the localized context learning system 102 does not modify parameters of the text encoder 616 or the image encoder 602. For instance, in some embodiments the localized context learning system 102 treats the text encoder 616 and image encoder 602 as fixed pre-trained components of the vision language machine learning model.

As mentioned, FIG. 6 describes the modification of parameters of a vision language machine learning model based on a determined measure of loss. Post-learning, the localized context learning system 102 implements a trained vision language machine learning model based on the principles discussed above. In particular, at inference time, the localized context learning system 102 via the trained vision language machine learning model processes digital images to generate a text representation. For instance, the localized context learning system 102 processes a digital image using the principles discussed above and generates a text output that describes the contents of the digital image (e.g., haircut at a hair salon). In some instances, the localized context learning system 102 processes a digital image along with a text query (e.g., "what is happening in this picture? Or "what is the person on the left doing?") and the localized context learning system 102 generates a text representation in response to the digital image and the text query. In some instances, the localized context learning system 102 processes a digital image along with a user selection input. For example, the localized context learning system 102 receives the digital image with certain pixel values selected by the user. Based on the digital image and the selected pixel values, the localized context learning system 102 generates a text representation corresponding to the selected pixel values.

As mentioned previously, the localized context learning system 102 focuses on local representations of an input image and deferentially weighs various learned prompt embeddings based on the local representations. For instance, in some embodiments the localized context learning system 102 trains a vision language machine learning model with a prompt context token length of four and with a training batch size of one for ten epochs. Furthermore, in some embodiments, the localized context learning system 102 utilizes a stochastic gradient descent as an optimizer. As mentioned above, experimenters have tested the efficacy of example implementations of the localized context learning system 102 as compared to prior systems. In particular, experimenters compared an example implementation of the localized context learning system 102 against prior methods such as CoCoOp, which is described in Kaiyang Zhou, Jingkang Yang, Chen Change Loy, and Ziwei Liu. Conditional prompt learning for vision-language models. In IEEE/CVF Conference on Computer Vision and Pattern Recognition, CVPR 2022, New Orleans, LA, USA, Jun. 18-24, 2022, pages 16795-16804. IEEE, 2022. Prior methods also include CoOp which is described in Kaiyang Zhou, Jingkang Yang, Chen Change Loy, and Ziwei Liu. Learning to prompt for vision-language models. Int. J. Comput. Vis., 130 (9): 2337-2348, 2022 and CLIP, which was previously mentioned.

FIG. 7A illustrates an ablation study of the localized context learning system 102. For example, FIG. 7A shows a model with "global attention+global features" as compared to "global attention+local features" for both seen classes and unseen classes. Further, FIG. 7A shows that for both the Caltech 101 dataset and the DTD dataset, the method of "global attention+local features" (e.g., the localized context learning system 102) outperforms "global attention+global features." Accordingly, FIG. 7A illustrates the importance of aligning the local contextual image features with the prompt context tokens.

FIG. 7B illustrates an additional study of an example implementation the localized context learning system 102. For example, FIG. 7B shows the average accuracy of the localized context learning system 102 compared to various prior methods on eleven different datasets. In particular, FIG. 7B shows training of various models on seen classes whereas the eleven datasets contain both seen and unseen classes. Thus, as shown in FIG. 7B, the localized context learning system 102 (indicated as CoPL in FIG. 7B) outperforms each of the other methods in terms of accuracy.

Figure 8:
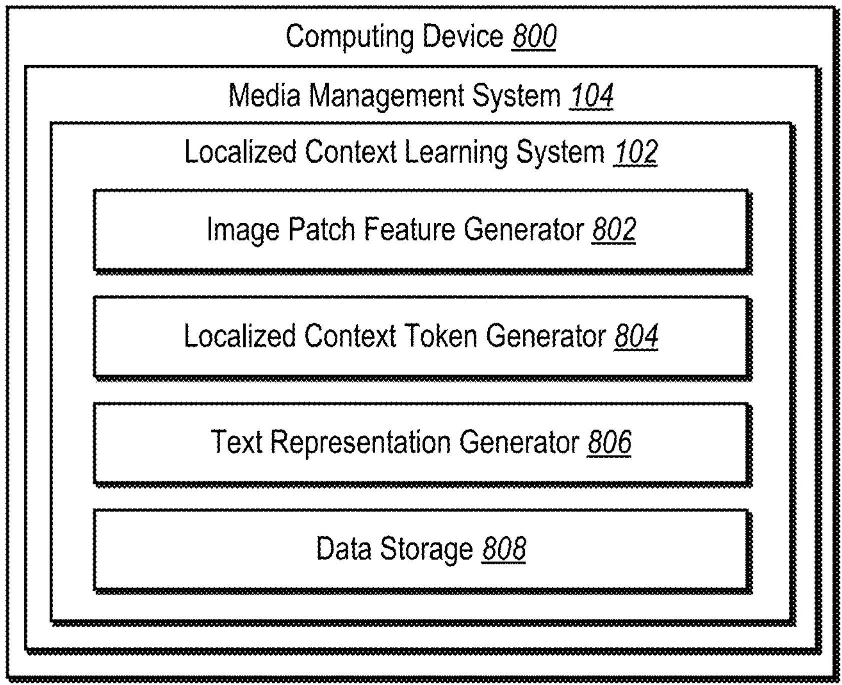
FIG. 8 illustrates an example schematic diagram of the localized context learning system in accordance with one or more embodiments.

Turning to FIG. 8, additional detail will now be provided regarding various components and capabilities of the localized context learning system 102. In particular, FIG. 8 illustrates an example schematic diagram of a computing device 800 (e.g., the server(s) 106 and/or the client device 110) implementing the localized context learning system 102 in accordance with one or more embodiments of the present disclosure for components 800-808. As illustrated in FIG. 8, the localized context learning system 102 includes an image patch feature generator 802, a localized context token generator 804, a text representation generator 806, and a data storage 808.

The image patch feature generator 802 generates image patch feature representations. For example, the image patch feature generator 802 generates image patch feature representations from a digital image (e.g., an input image). In particular, the image patch feature generator 802 processes extracted image patches from the input image and generates image patch feature representations from the image patches. Furthermore, the image patch feature generator 802 also generates conditional image patch tokens and image patch feature vectors. Moreover, the image patch feature generator 802 corresponds with various neural networks and models to generate the image patch feature representations.

The localized context token generator 804 generates localized context tokens. For example, the localized context token generator 804 generates localized context tokens from the image patch feature representations and prompt context tokens. Further, localized context token generator 804 manages an alignment model for processing the prompt context tokens and the image patch feature representations. Specifically, the localized context token generator 804 utilizes an alignment model to apply learned weights to adjust prompt context tokens according to the image patch feature representations. Moreover, the localized context token generator 804 determines alignment vectors from the alignment model to further generate the localized context tokens.

The text representation generator 806 generates text representations. For example, the text representation generator 806 generates a text representation of the input image. In particular, the text representation generator 806 generates the text representation of the input image by utilizing the localized context tokens. Moreover, in some embodiments, the text representation generator 806 utilizes both the localized context tokens and a ground truth classifier corresponding to the input image. At inference time, the text representation generator 806 generates predictions/representations that correspond with an input image and any additional information such as text queries or user selections of the input image.

The data storage 808 (e.g., implemented via one or more memory devices) stores digital images, training data, attention computation mechanisms, various machine learning models, ground truth classifiers, text queries, text representations, and prompt context tokens. For example, the data storage 808 stores digital images received as input, stores text representations generated from an input image, and stores training parameters such as prompt context tokens, context vectors, learned weights, and/or localized context tokens.

Each of the components 802-808 of the localized context learning system 102 can include software, hardware, or both. For example, the components 802-808 can include one or more instructions stored on a computer-readable storage medium and executable by processors of one or more computing devices, such as a client device or server device. When executed by the one or more processors, the computer-executable instructions of the localized context learning system 102 can cause the computing device(s) to perform the methods described herein. Alternatively, the components 802-808 can include hardware, such as a special-purpose processing device to perform a certain function or group of functions. Alternatively, the components 802-808 of the localized context learning system 102 can include a combination of computer-executable instructions and hardware.

Furthermore, the components 802-808 of the localized context learning system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-808 of the localized context learning system 102 may be implemented as a stand-alone application, such as a desktop or mobile application. Furthermore, the components 802-808 of the localized context learning system 102 may be implemented as one or more web-based applications hosted on a remote server. Alternatively, or additionally, the components 802-808 of the localized context learning system 102 may be implemented in a suite of mobile device applications or "apps." For example, in one or more embodiments, the localized context learning system 102 can comprise or operate in connection with digital software applications such as ADOBE® CREATIVE CLOUD EXPRESS, ADOBE® PHOTOSHOP, ADOBE® ILLUSTRATOR, ADOBE® PREMIERE, ADOBE® INDESIGN, and/or ADOBE® EXPERIENCE CLOUD. "ADOBE," "PHOTOSHOP," "INDESIGN," and "ILLUSTRATOR". The foregoing are either registered trademarks or trademarks of Adobe Inc. in the United States and/or other countries.

Figure 9:
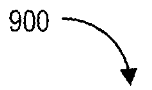
FIG. 9 illustrates a flowchart of a series of acts for generating a text representation in accordance with one or more embodiments.
Figure 9:
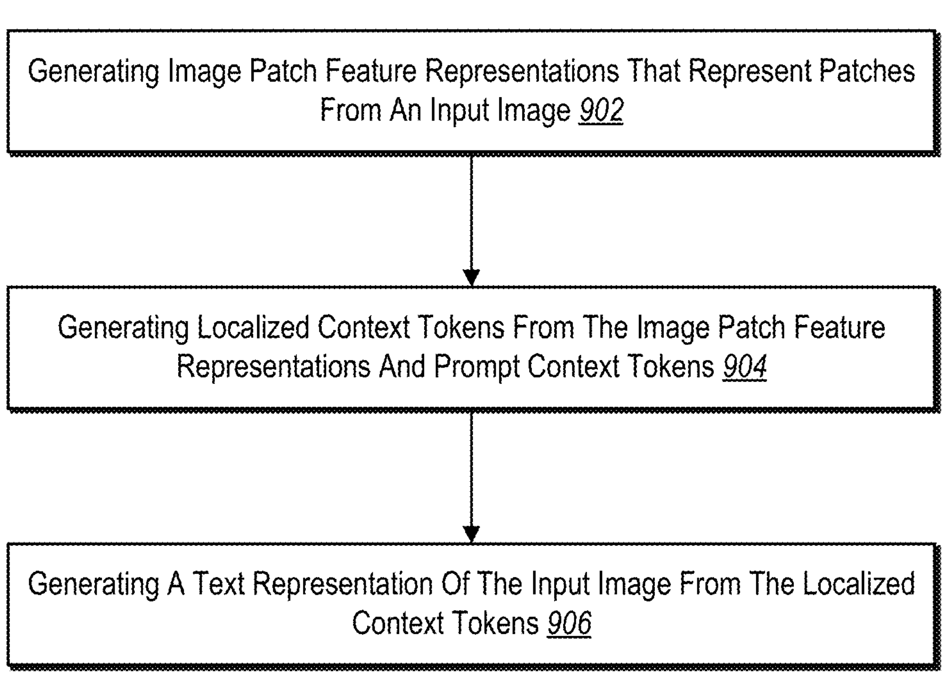

FIGS. 1-8, the corresponding text, and the examples provide a number of different methods, systems, devices, and non-transitory computer-readable media of the localized context learning system 102. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for generating a text representation in accordance with one or more embodiments. FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed as part of a computer-implemented method. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one memory device. The system further includes at least one server device configured to cause the system to perform the acts of FIG. 9.

The series of acts 900 includes an act 902 of generating image patch feature representations that represent patches from an input image, an act 904 of generating localized context tokens from the image patch feature representations and prompt context tokens, and an act 906 of generating a text representation of the input image from the localized context tokens.

In particular, the act 902 includes generating, utilizing an image encoder of a vision language machine learning model, image patch feature representations that represent patches from an input image, the act 904 includes generating, utilizing an attention layer of the vision language machine learning model, localized context tokens from the image patch feature representations and prompt context tokens, and the act 906 includes generating, utilizing a text encoder of the vision language machine learning model, a text representation of the input image from the localized context tokens.

For example, in one or more embodiments, the series of acts 900 includes extracting the patches from the input image, generating, utilizing the image encoder, image patch feature vectors from the patches, and generating, utilizing a neural network, conditional image patch tokens from the image patch feature vectors. In addition, in one or more embodiments, the series of acts 900 includes determining alignment vectors between the prompt context tokens and the conditional image patch tokens. Further, in one or more embodiments, the series of acts 900 includes generating context vectors for the patches from the input image by combining the alignment vectors and the prompt context tokens.

Moreover, in one or more embodiments, the series of acts 900 includes combining the context vectors for the patches from the input image with the prompt context tokens to generate the localized context tokens. Additionally, in one or more embodiments, the series of acts 900 includes generating, utilizing the image encoder, an image feature vector of the input image, determining a measure of loss by comparing the text representation with the image feature vector, and modifying the prompt context tokens and weights of the attention layer of the vision language machine learning model based on the determined measure of loss.

Furthermore, in one or more embodiments, the series of acts 900 includes training the vision language machine learning model by generating the text representation, utilizing the text encoder of the vision language machine learning model, from the localized context tokens and a ground truth class corresponding to the input image.

Moreover, in one or more embodiments, the series of acts 900 includes generating, utilizing the image encoder, image patch feature representations from a plurality of patches of the input image, utilizing the attention layer to generate localized context tokens by determining, alignment vectors between the prompt context tokens and the image patch feature representations, generating context vectors for the plurality of patches by combining the alignment vectors and the prompt context tokens, generating the localized context tokens by combining the context vectors for the plurality of patches with the prompt context tokens, and generating utilizing the text encoder, a text representation of the input image from the localized context tokens.

In addition, in one or more embodiments, the series of acts 900 includes generating the image patch feature representations by: generating, utilizing the image encoder, image patch feature vectors from the plurality of patches from the input image, and generating, utilizing a neural network, conditional image patch tokens from the plurality of patches from the input image. Further, in one or more embodiments, the series of acts 900 includes determining the alignment vectors by utilizing learned weights of the attention layer to compare the prompt context tokens with the image patch feature representations.

Moreover, in one or more embodiments, the series of acts 900 includes determining the alignment vectors between the prompt context tokens and the image patch feature representation by: generating a first alignment vector for a first prompt context token and a first image patch and generating a second alignment vector for a second prompt context token and a first image patch. Furthermore, in one or more embodiments, the series of acts 900 includes combining the first alignment vector and the second alignment vector to generate a first context vector and generating a first localized context token by combining the first context vector with the first prompt context token.

Additionally, in one or more embodiments, the series of acts 900 includes training the vision language machine learning model by: generating the text representation from the localized context tokens and a ground truth class corresponding to the input image and determining a measure of loss by comparing the text representation with an image feature vector of the input image. Moreover, in one or more embodiments, the series of acts 900 includes training the vision language machine learning model by modifying the prompt context tokens and learned weights of the attention layer of the vision language machine learning model based on a determined measure of loss.

Moreover, in one or more embodiments, the series of acts 900 includes generating, utilizing an image encoder, image patch feature representations that represent patches from an input image, determining, utilizing an alignment model, alignment vectors between prompt context tokens and the image patch feature representations, generating localized context tokens from the prompt context tokens utilizing the alignment vectors, and generating, utilizing a text encoder, a text representation of the input image from the localized context tokens.

Additionally, in one or more embodiments, the series of acts 900 includes generating, utilizing a neural network, conditional image patch tokens, and generating the alignment vectors by utilizing the conditional image patch tokens and the prompt context tokens. Further, in one or more embodiments, the series of acts 900 includes generating, utilizing a neural network, conditional image patch tokens from the patches of the input image and determining the alignment vectors by applying weights of the alignment model to the conditional image patch tokens and the prompt context tokens. Moreover, in one or more embodiments, the series of acts 900 includes generating context vectors by combining the alignment vectors and the prompt context tokens, and generating the localized context tokens by combining the context vectors with the prompt context tokens. Furthermore, in one or more embodiments, the series of acts 900 includes processing, utilizing the text encoder, a ground truth class corresponding to the input image. Moreover, in one or more embodiments, the series of acts 900 includes generating, utilizing the image encoder, an image feature vector of the input image, determining a measure of loss by comparing the text representation with the image feature vector, and modifying the prompt context tokens and weights of the alignment model based on the determined measure of loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
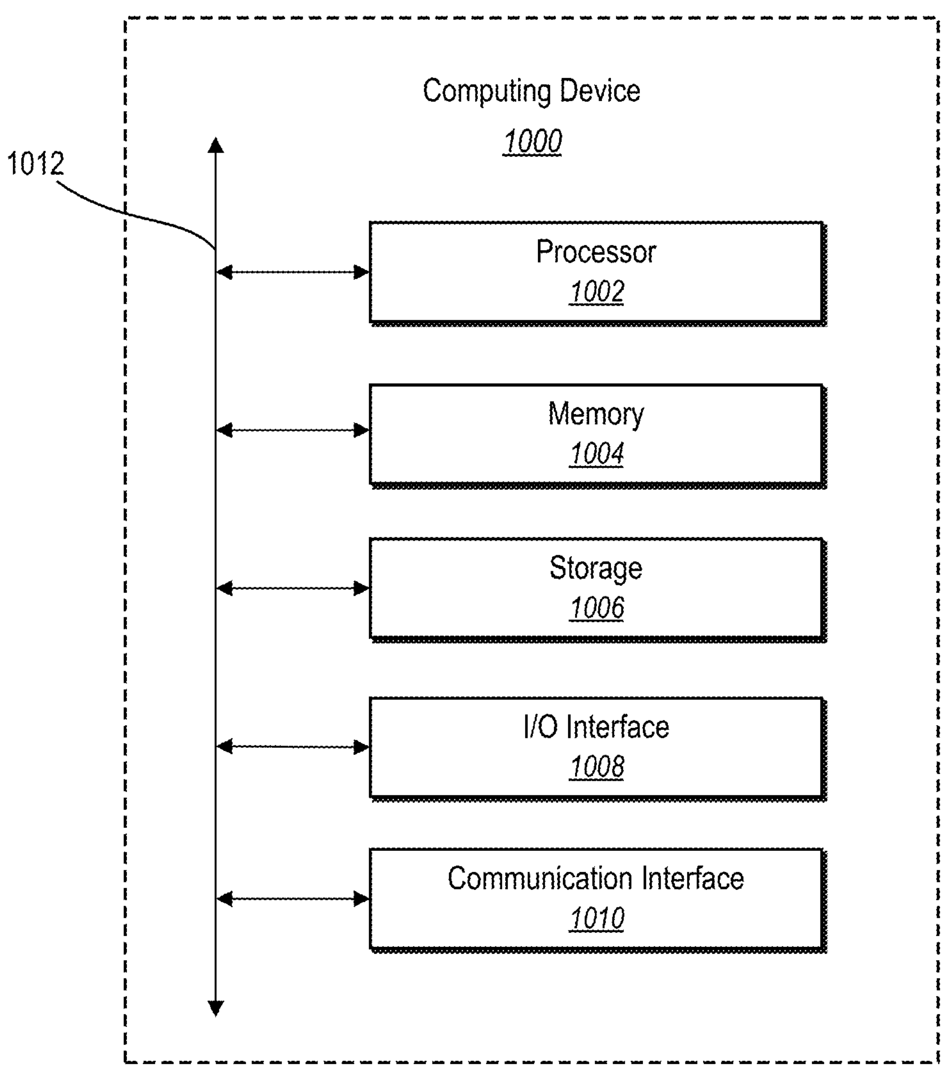
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 106 and/or the client device 110). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating, utilizing an image encoder of a vision language machine learning model, image patch feature representations that represent patches from an input image;

identifying learned prompt context tokens, wherein the learned prompt context tokens are learned in training the vision language machine learning model;

utilizing an attention layer to generate localized context tokens by:

generating, utilizing an alignment model of the attention layer, alignment vectors between the learned prompt context tokens and the image patch feature representations by weighing the learned prompt context tokens according to the image patch feature representations;

generating context vectors by combining the alignment vectors and the learned prompt context tokens; and generating, utilizing an attention layer of the vision language machine learning model, the localized context tokens by combining the context vectors with the learned prompt context tokens; and generating, utilizing a text encoder of the vision language machine learning model, a text caption describing the input image from the localized context tokens generated based on the alignment vectors and the learned prompt context tokens.

2. The computer-implemented method of claim 1, wherein generating the image patch feature representations comprises:

extracting the patches from the input image;

generating, utilizing the image encoder, image patch feature vectors from the patches; and generating, utilizing a neural network, conditional image patch tokens from the image patch feature vectors.

3. The computer-implemented method of claim 1, wherein training the vision language machine learning model further comprises:

initializing prompt context tokens by selecting the prompt context tokens from a distribution; and utilizing the prompt context tokens as learnable parameters for the vision language machine learning model.

4. The computer-implemented method of claim 1, wherein generating the alignment vectors comprises utilizing learned weights to compare the learned prompt context tokens with conditional image patch tokens.

5. The computer-implemented method of claim 1, wherein generating, utilizing the attention layer of the vision language machine learning model, the localized context tokens further comprises combining the context vectors for the patches from the input image with the learned prompt context tokens to generate the localized context tokens.

6. The computer-implemented method of claim 1, wherein training the vision language machine learning model further comprises:

generating, utilizing the image encoder, an image feature vector of the input image;

determining a measure of loss by comparing the text caption with the image feature vector; and modifying prompt context tokens initialized from a distribution and weights of the attention layer of the vision language machine learning model based on the determined measure of loss.

7. The computer-implemented method of claim 6, further comprising training the vision language machine learning model by generating the text caption, utilizing the text encoder of the vision language machine learning model, from the localized context tokens and a ground truth class corresponding to the input image.

8. A system comprising:

one or more memory devices comprising an input image, learned prompt context tokens, and a vision language machine learning model comprising an image encoder, an attention layer, and a text encoder; and one or more processors configured to cause the system to:

generate, utilizing the image encoder, image patch feature representations from a plurality of patches of the input image;

identify learned prompt context tokens, wherein the learned prompt context tokens are learned in training the vision language machine learning model;

utilize the attention layer to generate localized context tokens by:

generating, utilizing an alignment model, alignment vectors between the learned prompt context tokens and the image patch feature representations generated from the plurality of patches of the input image by weighing the learned prompt context tokens according to the image patch feature representations;

generating context vectors for the plurality of patches by combining the alignment vectors generated from weighting the learned prompt context tokens according to the image patch feature representations and the learned prompt context tokens; and generating the localized context tokens by combining the context vectors generated from the alignment vectors and the learned prompt context tokens with the learned prompt context tokens; and generate, utilizing the text encoder, a text representation that textually describes the input image from the localized context tokens that are generated from the context vectors and the learned prompt context tokens.

9. The system of claim 8, wherein the one or more processors are configured to cause the system to generate the image patch feature representations by:

generating, utilizing the image encoder, image patch feature vectors from the plurality of patches from the input image; and generating, utilizing a neural network, conditional image patch tokens from the plurality of patches from the input image.

10. The system of claim 8, wherein generating the alignment vectors comprises utilizing learned weights of the attention layer to compare the learned prompt context tokens with the image patch feature representations.

11. The system of claim 8, wherein the one or more processors are configured to cause the system to train the vision language machine learning model by:

generating the text representation from the localized context tokens and a ground truth class corresponding to the input image; and determining a measure of loss by comparing the text representation with an image feature vector of the input image.

12. The system of claim 8, wherein the one or more processors are configured to cause the system to train the vision language machine learning model by modifying prompt context tokens and learned weights of the attention layer of the vision language machine learning model based on a determined measure of loss.

13. The system of claim 8, wherein generating the alignment vectors between the learned prompt context tokens and the image patch feature representations comprises:

generating a first alignment vector for a first learned prompt context token and a first image patch; and generating a second alignment vector for a second learned prompt context token and a first image patch.

14. The system of claim 13, wherein the one or more processors are configured to cause the system to:

combine the first alignment vector and the second alignment vector to generate a first context vector; and generate a first localized context token by combining the first context vector with the first learned prompt context token.

15. A non-transitory computer-readable medium storing executable instructions which, when executed by a processing device, cause the processing device to perform operations comprising:

generating, utilizing an image encoder, image patch feature representations that represent patches from an input image;

identifying learned prompt context tokens, wherein the learned prompt context tokens are learned in training a vision language machine learning model;

generating, utilizing an alignment model, alignment vectors between the learned prompt context tokens and the image patch feature representations by weighing the learned prompt context tokens according to the image patch feature representations generated from the patches of the input image;

generating localized context tokens from the learned prompt context tokens and from utilizing the alignment vectors generated by weighting the learned prompt context tokens according to the image patch feature representations; and generating, utilizing a text encoder, a text representation of the input image from the localized context tokens generated from the learned prompt context tokens and the alignment vectors.

16. The non-transitory computer-readable medium of claim 15, wherein generating the image patch feature representations further comprises:

generating, utilizing a neural network, conditional image patch tokens; and generating the alignment vectors by utilizing the conditional image patch tokens and the learned prompt context tokens.

17. The non-transitory computer-readable medium of claim 15, wherein determining the alignment vectors further comprises:

generating, utilizing a neural network, conditional image patch tokens from the patches of the input image; and determining the alignment vectors by applying weights of the alignment model to the conditional image patch tokens and the learned prompt context tokens.

18. The non-transitory computer-readable medium of claim 15, wherein generating the localized context tokens further comprises:

generating context vectors by combining the alignment vectors and the learned prompt context tokens; and generating the localized context tokens by combining the context vectors with the learned prompt context tokens.

19. The non-transitory computer-readable medium of claim 15, wherein generating the text representation further comprises processing, utilizing the text encoder, a ground truth class corresponding to the input image.

20. The non-transitory computer-readable medium of claim 15, wherein the operations further comprise training the vision language machine learning model by:

generating, utilizing the image encoder, an image feature vector of the input image;

determining a measure of loss by comparing the text representation with the image feature vector; and modifying prompt context tokens initialized from a distribution and weights of the alignment model based on the determined measure of loss.

* * * * *